United States Patent
Ray et al.

(10) Patent No.: US 10,691,824 B2
(45) Date of Patent: *Jun. 23, 2020

(54) BEHAVIORAL-BASED CONTROL OF ACCESS TO ENCRYPTED CONTENT BY A PROCESS

(71) Applicant: Sophos Limited, Abingdon (GB)

(72) Inventors: Kenneth D. Ray, Seattle, WA (US); Andrew J. Thomas, Oxfordshire (GB); Anthony John Merry, Kessel-lo (BE); Harald Schütz, Linz (AT); Andreas Berger, Hellmonsoedt (AT); John Edward Tyrone Shaw, Oxford (GB)

(73) Assignee: Sophos Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,417

(22) Filed: Jan. 15, 2019

(65) Prior Publication Data

US 2019/0228172 A1    Jul. 25, 2019

Related U.S. Application Data

(63) Continuation of application No. 15/817,705, filed on Nov. 20, 2017, and a continuation of application No.
(Continued)

(51) Int. Cl.
  *G06F 21/62*  (2013.01)
  *G06F 21/55*  (2013.01)
  *H04L 29/06*  (2006.01)

(52) U.S. Cl.
  CPC ........ *G06F 21/6218* (2013.01); *G06F 21/554* (2013.01); *H04L 63/1408* (2013.01)

(58) Field of Classification Search
  CPC .... G06F 21/554; G06F 21/6218; G06F 21/52; G06F 21/54; G06F 21/56; G06F 21/602;
  (Continued)

(56) References Cited

U.S. PATENT DOCUMENTS

| 6,023,506 A | 2/2000 | Ote et al. |
| 6,856,686 B2 | 2/2005 | Disanto et al. |

(Continued)

FOREIGN PATENT DOCUMENTS

| EP | 2659614 | 11/2013 |
| GB | 2516972 | 2/2015 |

(Continued)

OTHER PUBLICATIONS

USPTO, "U.S. Appl. No. 15/042,862 Non-Final Office Action dated Dec. 19, 2017", 28 pages.

(Continued)

*Primary Examiner* — Abiy Getachew
(74) *Attorney, Agent, or Firm* — Strategic Patents, P.C.

(57) ABSTRACT

Securing an endpoint against exposure to unsafe content includes encrypting files to prevent unauthorized access, and monitoring an exposure state of a process to potentially unsafe content by applying behavioral rules to determine whether the exposure state is either exposed or secure, where (1) the process is initially identified as secure, (2) the process is identified as exposed when the process opens a network connection to a URL that is not internal to an enterprise network of the endpoint and that has a poor reputation, (3) the process is identified as exposed when it opens a file identified as exposed, and (4) the process is identified as exposed when another exposed process opens a handle to the process. Access to the files may be restricted when the process is exposed by controlling access through a file system filter that conditionally decrypts files for the process according to its exposure state.

19 Claims, 9 Drawing Sheets

Related U.S. Application Data

15/042,862, filed on Feb. 12, 2016, which is a continuation of application No. 15/042,916, filed on Feb. 12, 2016, now Pat. No. 9,984,248.

(58) Field of Classification Search
CPC ....... G06F 2221/033; G06F 2221/2107; H04L 63/1408; H04L 63/02; H04L 63/20; G03F 7/705; G03F 7/70625; G03F 7/70641; G03F 7/70683; G03F 1/42; G03F 7/0382; G03F 7/0392; G03F 7/70066; Y10S 430/143; A61L 2/28; B22F 3/1055; B29C 2948/92571; B29C 2949/78563; B29C 35/08; B29C 64/135; B29C 64/153; B29C 64/386; B29C 64/393; B29C 70/543; B33Y 50/02; G01K 3/04; G05B 15/02; G05B 2219/49023
See application file for complete search history.

(56) References Cited

U.S. PATENT DOCUMENTS

| | | | |
|---|---|---|---|
| 6,947,556 | B1 | 9/2005 | Matyas, Jr. et al. |
| 7,251,827 | B1 | 7/2007 | Guo et al. |
| 7,373,517 | B1 | 5/2008 | Riggins |
| 7,539,306 | B2 | 5/2009 | Ohta et al. |
| 7,783,666 | B1 | 8/2010 | Zhuge et al. |
| 7,953,989 | B1 | 5/2011 | Hsiang et al. |
| 8,065,724 | B2 | 11/2011 | Waltenberg et al. |
| 8,140,857 | B2 | 3/2012 | Forlenza et al. |
| 8,281,382 | B1 | 10/2012 | Sanyal et al. |
| 8,447,967 | B1 | 5/2013 | Janacek et al. |
| 8,458,462 | B1 | 6/2013 | Hanna et al. |
| 8,538,020 | B1 | 9/2013 | Miller |
| 8,572,757 | B1 | 10/2013 | Stamos et al. |
| 8,601,263 | B1 | 12/2013 | Shankar et al. |
| 8,631,460 | B2 | 1/2014 | Fleck et al. |
| 8,788,816 | B1 | 7/2014 | Spaulding et al. |
| 8,806,618 | B2 | 8/2014 | Livshits et al. |
| 8,837,739 | B1 | 9/2014 | Sexton et al. |
| 8,892,875 | B1 | 11/2014 | Baldwin et al. |
| 8,955,042 | B2 | 2/2015 | Fleck et al. |
| 9,032,531 | B1 | 5/2015 | Scorvo et al. |
| 9,088,556 | B2 | 7/2015 | Truskovsky et al. |
| 9,251,341 | B1 | 2/2016 | Northup |
| 9,411,975 | B2 | 8/2016 | Smith et al. |
| 9,444,824 | B1 | 9/2016 | Balazs et al. |
| 9,578,017 | B2 | 2/2017 | Ferguson et al. |
| 9,639,699 | B1 | 5/2017 | Kurupati |
| 10,225,084 | B1 | 3/2019 | Machani |
| 10,291,619 | B2 | 5/2019 | Odom et al. |
| 2001/0056541 | A1 | 12/2001 | Matsuzaki et al. |
| 2002/0007453 | A1 | 1/2002 | Nemovicher |
| 2002/0071554 | A1 | 6/2002 | Scheidt et al. |
| 2002/0178353 | A1 | 11/2002 | Graham et al. |
| 2002/0184485 | A1 | 12/2002 | Dray et al. |
| 2003/0159070 | A1 | 8/2003 | Mayer et al. |
| 2003/0172033 | A1 | 9/2003 | Risan et al. |
| 2004/0025007 | A1 | 2/2004 | Kotnur et al. |
| 2004/0128259 | A1 | 7/2004 | Blakeley et al. |
| 2004/0128547 | A1 | 7/2004 | Laidlaw et al. |
| 2005/0071632 | A1 | 3/2005 | Pauker et al. |
| 2005/0132204 | A1 | 6/2005 | Gouguenheim et al. |
| 2005/0138353 | A1 | 6/2005 | Spies et al. |
| 2005/0149745 | A1 | 7/2005 | Ishidoshiro et al. |
| 2006/0010074 | A1 | 1/2006 | Zeitsiff et al. |
| 2006/0212715 | A1 | 9/2006 | Terao |
| 2007/0143827 | A1 | 6/2007 | Nicodemus et al. |
| 2007/0297610 | A1 | 12/2007 | Chen et al. |
| 2008/0077994 | A1 | 3/2008 | Comlekoglu et al. |
| 2008/0195872 | A1 | 8/2008 | Chow et al. |
| 2009/0089591 | A1 | 4/2009 | Mattsson |
| 2009/0097662 | A1 | 4/2009 | Olechowski et al. |
| 2009/0144545 | A1 | 6/2009 | Dhuvur et al. |
| 2009/0220088 | A1 | 9/2009 | Lu et al. |
| 2010/0153709 | A1 | 6/2010 | Thomas et al. |
| 2010/0161961 | A1 | 6/2010 | Beigelman et al. |
| 2010/0211802 | A1 | 8/2010 | Humphries et al. |
| 2010/0250925 | A1 | 9/2010 | Hiraide et al. |
| 2010/0306537 | A1 | 12/2010 | Cohen et al. |
| 2010/0317420 | A1 | 12/2010 | Hoffberg |
| 2011/0016311 | A1 | 1/2011 | Durand et al. |
| 2011/0138465 | A1 | 6/2011 | Franklin et al. |
| 2011/0238979 | A1 | 9/2011 | Harp et al. |
| 2011/0321139 | A1 | 12/2011 | Jayaraman et al. |
| 2012/0102317 | A1 | 4/2012 | Mathur et al. |
| 2012/0151553 | A1 | 6/2012 | Burgess et al. |
| 2013/0013339 | A1 | 1/2013 | Goldman et al. |
| 2013/0039491 | A1 | 2/2013 | Unagami et al. |
| 2013/0125202 | A1 | 5/2013 | Sprague et al. |
| 2013/0125247 | A1 | 5/2013 | Sprague et al. |
| 2013/0156196 | A1 | 6/2013 | Jogand-Coulomb et al. |
| 2013/0238491 | A1 | 9/2013 | Bouey et al. |
| 2013/0283033 | A1 | 10/2013 | Ahuja et al. |
| 2013/0318125 | A1 | 11/2013 | Smith et al. |
| 2014/0094159 | A1 | 4/2014 | Raleigh et al. |
| 2014/0098671 | A1 | 4/2014 | Raleigh et al. |
| 2014/0189808 | A1 | 7/2014 | Mahaffey et al. |
| 2014/0281542 | A1 | 9/2014 | Bono et al. |
| 2014/0281545 | A1 | 9/2014 | Erofeev et al. |
| 2014/0351586 | A1* | 11/2014 | Hook ................. H04L 9/14 713/164 |
| 2014/0373143 | A1 | 12/2014 | Chesla et al. |
| 2014/0380048 | A1 | 12/2014 | He et al. |
| 2015/0127607 | A1 | 5/2015 | Savage et al. |
| 2015/0235011 | A1 | 8/2015 | Swaminathan et al. |
| 2015/0281273 | A1 | 10/2015 | Shields |
| 2015/0302218 | A1 | 10/2015 | Fielder |
| 2015/0319185 | A1 | 11/2015 | Kirti et al. |
| 2015/0379278 | A1 | 12/2015 | Thota et al. |
| 2015/0381656 | A1 | 12/2015 | Kelson et al. |
| 2016/0078225 | A1 | 3/2016 | Ray et al. |
| 2016/0078245 | A1 | 3/2016 | Amarendran et al. |
| 2016/0080417 | A1 | 3/2016 | Thomas et al. |
| 2016/0191476 | A1 | 6/2016 | Schutz et al. |
| 2016/0191521 | A1 | 6/2016 | Feroz et al. |
| 2016/0191544 | A1* | 6/2016 | Kim ................. H04L 63/123 713/171 |
| 2016/0191554 | A1 | 6/2016 | Kaminsky |
| 2016/0306967 | A1 | 10/2016 | Hart et al. |
| 2017/0005803 | A1 | 1/2017 | Brownewell et al. |
| 2017/0013000 | A1 | 1/2017 | El-moussa et al. |
| 2017/0093569 | A1 | 3/2017 | Roth et al. |
| 2017/0235966 | A1 | 8/2017 | Ray et al. |
| 2017/0235967 | A1 | 8/2017 | Ray et al. |
| 2017/0289179 | A1 | 10/2017 | Dubuc et al. |
| 2017/0302458 | A1 | 10/2017 | Berger et al. |
| 2017/0302635 | A1 | 10/2017 | Humphries et al. |
| 2017/0302653 | A1 | 10/2017 | Ortner et al. |
| 2017/0302696 | A1 | 10/2017 | Schutz et al. |
| 2017/0359370 | A1 | 12/2017 | Humphries et al. |
| 2018/0007014 | A1 | 1/2018 | Neal |
| 2018/0048658 | A1 | 2/2018 | Hittel et al. |
| 2018/0075249 | A1 | 3/2018 | Ray et al. |
| 2019/0253399 | A1 | 8/2019 | Humphries et al. |
| 2020/0014666 | A1 | 1/2020 | Neal |

FOREIGN PATENT DOCUMENTS

| | | |
|---|---|---|
| WO | WO-2009095413 | 8/2009 |
| WO | WO-2016038397 | 3/2016 |
| WO | WO-2017138976 | 8/2017 |

OTHER PUBLICATIONS

USPTO, "U.S. Appl. No. 15/042,862 Notice of Allowance dated Jan. 18, 2019", 11 pages.
USPTO, "U.S. Appl. No. 15/042,862 Notice of Allowance dated Jul. 16, 2018", 21 pages.
USPTO, "U.S. Appl. No. 15/042,862 Notice of Allowance dated Aug. 10, 2018", 8 pages.

(56) References Cited

OTHER PUBLICATIONS

USPTO, "U.S. Appl. No. 15/042,916 Notice of Allowance dated Apr. 5, 2018", 8 pages.
USPTO, "U.S. Appl. No. 15/042,916 Notice of Allowance dated Oct. 2, 2017", 7 pages.
USPTO, "U.S. Appl. No. 15/042,916 Notice of Allowance dated Dec. 22, 2017", 12 pages.
USPTO, "U.S. Appl. No. 15/098,684 Non-Final Office Action dated Oct. 3, 2017", 11 pages.
USPTO, "U.S. Appl. No. 15/098,684 Notice of Allowance dated May 23, 2018", 12 pages.
USPTO, "U.S. Appl. No. 15/098,684 Notice of Allowance dated Aug. 28, 2018", 8 pages.
USPTO, "U.S. Appl. No. 15/098,684 Notice of Allowance dated Oct. 15, 2018", 5 pages.
USPTO, "U.S. Appl. No. 15/098,684 Notice of Allowance dated Nov. 27, 2018", 8 pages.
USPTO, "U.S. Appl. No. 15/098,720 Non-Final Office Action dated Feb. 8, 2018", 19 pages.
USPTO, "U.S. Appl. No. 15/098,720 Notice of Allowance dated Aug. 28, 2018", 13 pages.
USPTO, "U.S. Appl. No. 15/099,524 Final Office Action dated Jun. 7, 2018", 10 pages.
USPTO, "U.S. Appl. No. 15/099,524 Non-Final Office Action dated Sep. 22, 2017", 16 pages.
USPTO, "U.S. Appl. No. 15/099,542 Final Office Action dated Jun. 6, 2018", 19 pages.
USPTO, "U.S. Appl. No. 15/099,542 Non-Final Office Action dated Oct. 27, 2017", 19 pages.
USPTO, "U.S. Appl. No. 15/179,447 Final Office Action dated Jan. 22, 2019", 23 pages.
USPTO, "U.S. Appl. No. 15/179,447 Non-Final Office Action dated Jul. 12, 2018", 22 pages.
USPTO, "U.S. Appl. No. 15/429,291 Non-Final Office Action dated Sep. 11, 2018", 8 pages.
USPTO, "U.S. Appl. No. 15/817,705 Non-Final Office Action dated Jun. 8, 2018", 26 pages.
USPTO, "U.S. Appl. No. 15/817,705 Notice of Allowance dated Aug. 28, 2018", 11 pages.
USPTO, "U.S. Appl. No. 15/817,705 Notice of Allowance dated Oct. 17, 2018", 8 pages.
UKIPO, "Application No. GB1611484.5 Search and First Examination Report dated Feb. 14, 2017", 8 pages.
USPTO, "U.S. Appl. No. 15/042,916, Non-Final Office Action dated Sep. 1, 2017", 15 pages.
WIPO, "PCT Application No. PCT/US16/38020 International Preliminary Report on Patentability dated Aug. 23, 2018", 10 pages.
ISA, "PCT Application No. PCT/US16/38020 International Search Report and Written Opinion dated Apr. 18, 2017", 14 pages.
IPO, "UK Application No. 1717704.9 Search and Examination Report dated Jan. 25, 2018", 5 pages.
IPO, "UK Application No. 1808581.1 Search and Examination Report dated Nov. 27, 2018", 9 pages.
USPTO, "U.S. Appl. No. 15/042,862 Notice of Allowance dated Mar. 14, 2019", 8 pages.
USPTO, "U.S. Appl. No. 15/098,720 Notice of Allowance dated Mar. 29, 2019", 11 pages.
USPTO, "U.S. Appl. No. 15/099,524 Notice of Allowance dated Feb. 14, 2019", 6 pages.
USPTO, "U.S. Appl. No. 15/099,542 Non-Final Office Action dated Apr. 16, 2019", 20 pages.
USPTO, "U.S. Appl. No. 15/429,291 Notice of Allowance dated Apr. 24, 2019", 10 pages.
USPTO, "U.S. Appl. No. 15/817,705 Notice of Allowance dated Feb. 6, 2019", 8 pages.
USPTO, "U.S. Appl. No. 15/817,705 Notice of Allowance dated Mar. 28, 2019", 8 pages.
USPTO, "U.S. Appl. No. 15/042,862 Notice of Allowance dated Jul. 29, 2019", 14 pages.
USPTO, "U.S. Appl. No. 15/098,720 Notice of Allowance dated Aug. 7, 2019", 8 pages.
USPTO, "U.S. Appl. No. 15/179,447 Notice of Allowance dated Jul. 2, 2019", 11 pages.
USPTO, "U.S. Appl. No. 15/817,705 Notice of Allowance dated Aug. 21, 2019", 8 pages.
USPTO, "U.S. Appl. No. 15/042,862 Notice of Allowance dated May 1, 2019", 8 pages.
USPTO, "U.S. Appl. No. 15/098,720 Notice of Allowance dated Jun. 11, 2019", 5 pages.
USPTO, "U.S. Appl. No. 15/429,291 Notice of Allowance dated Jun. 4, 2019", 7 pages.
USPTO, "U.S. Appl. No. 15/817,705 Notice of Allowance dated May 6, 2019", 10 pages.
IPO, "UK Application No. 1808581.1 Examination Report dated Jun. 12, 2019", 2 pages.
Shahzad, Farrukh, "Safe Haven in the Cloud: Secure Access Controlled File Encryption (SAFE) System", 2015 Science and information conference (SAI), IEEE 2015, 6 pages.
Wang, Hoa et al., "Server Aided Ciphertext-Policy Attribute-Based Encryption", 2015 IEEE 29th International Conference on Advanced Information Networking and Applications Workshops. 2015, 5 pages.
USPTO, "U.S. Appl. No. 15/099,542 Notice of Allowance dated Oct. 18, 2019", 10 pages.
Lekshmi, Vijaya et al., "Implementing Secure Data Access Control for Mulit-Authority Cloud Storage System Using Ciphertext Policy-Attribute Based Encryption", International conference on information communication and embedded systems (ICICES2014). 6 pages.
USPTO, "U.S. Appl. No. 15/179,447 Notice of Allowance dated Nov. 22, 2019", 11 pages.
"SafeGuard Enterprise User Help", Product version 7 Dec. 2014, 88 pages.
USPTO, "U.S. Appl. No. 15/817,705 Notice of Allowance dated Jan. 14, 2020", 11 pages.
USPTO, "U.S. Appl. No. 16/246,891 Non-Final Office Action dated Jan. 9, 2020", 15 pages.
USPTO, "U.S. Appl. No. 15/042,862, Notice of Allowance dated Jan. 16, 2020", 9 pages.
USPTO, "U.S. Appl. No. 15/099,542, Notice of Allowance dated Dec. 11, 2019", 11 pages.

* cited by examiner

BEHAVIORAL-BASED CONTROL OF ACCESS TO ENCRYPTED CONTENT BY A PROCESS

CROSS-REFERENCE TO RELATED APPLICATIONS

This application is a continuation of U.S. patent application Ser. No. 15/042,862, filed Feb. 12, 2016, and a continuation of U.S. patent application Ser. No. 15/817,705, filed Nov. 20, 2017, which is a continuation of U.S. patent application Ser. No. 15/042,916, filed Feb. 12, 2016 (now U.S. Pat. No. 9,984,248), with the entire contents of each of these applications hereby incorporated herein by reference.

TECHNICAL FIELD

This application relates to enterprise network security, and more specifically to methods and systems for improving detection of and response to malware and other security breaches.

BACKGROUND

Enterprise networks can contain valuable information that forms an increasingly attractive target for malicious actors. Useful techniques for securing endpoints in a network against malicious activity are described by way of example in commonly-owned U.S. patent application Ser. No. 14/263,955, filed on Apr. 28, 2014, U.S. patent application Ser. No. 14/263,966, filed Apr. 28, 2014, and U.S. application Ser. No. 14/485,759, filed on Sep. 14, 2014, each of which is hereby incorporated by reference in its entirety. However, there remains a need for improved security techniques to address the growing number, type and sophistication of malicious attacks deployed in today's network environment.

SUMMARY

An extension to a file system on an endpoint supports transparent, process-level control over encryption and decryption of files. At the same time an integrity monitor evaluates a security state of a process on the endpoint to detect when the process is compromised or otherwise exposed to potentially unsafe content. The extension to the file system can receive security status information from the integrity monitor and responsively apply rules for whether to allow or prohibit access to encrypted files within the file system on a process-by-process basis.

In an aspect, a computer program product for securing an endpoint against exposure to unsafe or unknown content includes computer-executable code embodied in a non-transitory computer readable medium that, when executing on the endpoint performs the steps of encrypting a plurality of files on an endpoint to prevent unauthorized access to the plurality of files, monitoring an exposure state of a process on the endpoint to potentially unsafe content by applying a plurality of behavioral rules to determine whether the exposure state of the process is either exposed or secure, where (1) the process is initially identified as secure, (2) the process is identified as exposed when the process opens a network connection to a Uniform Resource Locator that is not internal to an enterprise network of the endpoint and that has a reputation that is poor, (3) the process is identified as exposed when the process opens a first file that is identified as exposed, and (4) the process is identified as exposed when another exposed process opens a handle to the process. The computer program product may also include computer-executable code that performs the step of restricting access by the process to the plurality of files when the process is exposed by controlling access to the plurality of files through a file system filter that conditionally decrypts one or more of the plurality of files for the process according to the exposure state of the process.

Implementations may include one or more of the following features. The reputation of the Uniform Resource Locator may be obtained from a remote threat management facility. The file system filter may conditionally decrypt one or more of the plurality of files using a cryptographic key, where the file system filter is configured to respond to an indication of compromise for the endpoint by deleting the cryptographic key on the endpoint. Restricting access by the process to the plurality of files may include maintaining access to any of the plurality of files that have been opened by the process before the process became exposed, and preventing access to other ones of the plurality of files.

In an aspect, a method includes encrypting a plurality of files on an endpoint to prevent unauthorized access to the plurality of files, monitoring an exposure state of a process on the endpoint to potentially unsafe content by applying a plurality of behavioral rules to determine whether the exposure state of the process is either exposed or secure, where the process is initially identified as secure and the process is identified as exposed based on contact with content other than the plurality of files, and restricting access by the process to the plurality of files when the process is exposed.

Implementations may include one or more of the following features. The method may include identifying the process as exposed according to the plurality of behavioral rules, where (1) the process is identified as exposed when the process opens a network connection to a Uniform Resource Locator that is not internal to an enterprise network of the endpoint and that has a reputation that is poor, (2) the process is identified as exposed when the process opens a first file that is identified as exposed, and (3) the process is identified as exposed when another exposed process opens a handle to the process. The method may further include identifying the first file as exposed when at least one of the following conditions is met: (1) the first file is not one of the plurality of files, (2) the first file is saved by a second process that is identified as exposed, and (3) a source of the first file has a low reputation. The first file may be identified as exposed based upon a scan of the first file. The reputation for the Uniform Resource Locator may be obtained from a remote threat management facility. Restricting access by the process to the plurality of files may include controlling access through an extension to a file system for the endpoint, where the extension conditionally decrypts one or more of the plurality of files for the process according to the exposure state of the process. The extension may conditionally decrypt one or more of the plurality of files using a cryptographic key, where the extension is configured to respond to an indication of compromise for the endpoint by deleting the cryptographic key on the endpoint. The extension may include at least one of a mount point for the file system and a file system filter for the file system. Restricting access by the process to the plurality of files may include maintaining access to any of the plurality of files that have been opened by the process before the process became exposed, and preventing access to other ones of the plurality of files. The method may include monitoring a security state of the process and restricting access by the process to the plurality of files when the security state is compromised. Monitoring the security state may include remotely monitoring the security state at a threat management facility or locally monitoring the security state with a malware file scanner. The method may include initiating a remediation of the process when the process is exposed, the remediation including facilitating a restart of the process. If the remediation is successful, the method may include restoring access to all of the plurality of files by the process. The method may include providing a notification to a user in a display of the endpoint, the notification indicating a required remediation step for the process to resolve the exposure state, and the notification informing the user that an application associated with the process cannot access additional files until the user completes the required remediation step.

In an aspect, a system includes an endpoint, a first memory on the endpoint storing a plurality of files encrypted to prevent unauthorized access, a process executing on the endpoint, and a file system on the endpoint configured to manage access to the plurality of files by the process, the file system including an extension configured to monitor an exposure state of the process and to restrict access to the one of the files based on the exposure state of the process by conditionally decrypting the one of the files based on the exposure state. The system may also include an integrity monitor configured to evaluate the exposure state by applying a plurality of behavioral rules to determine whether the exposure state of the process is either exposed or secure, where the process is initially identified as secure and the process is identified as exposed based on contact with content other than the plurality of files. The system may further include a remediation component configured to remediate the process from the exposed state to the secure state for unrestricted access to the plurality of files.

Implementations may include one or more of the following features. The integrity monitor may be further configured to identify the process as exposed according to the plurality of behavioral rules, where (1) the process is identified as exposed when the process opens a network connection to a Uniform Resource Locator that is not internal to an enterprise network of the endpoint and that has a reputation that is poor, (2) the process is identified as exposed when the process opens a first file that is identified as exposed, and (3) the process is identified as exposed when another exposed process opens a handle to the process. The extension to the file system may include at least one of a mount point and a file system filter. The extension to the file system may maintain access to any of the plurality of files that have been opened by the process before the process became exposed, and prevent access to other ones of the plurality of files.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

Figure 1:
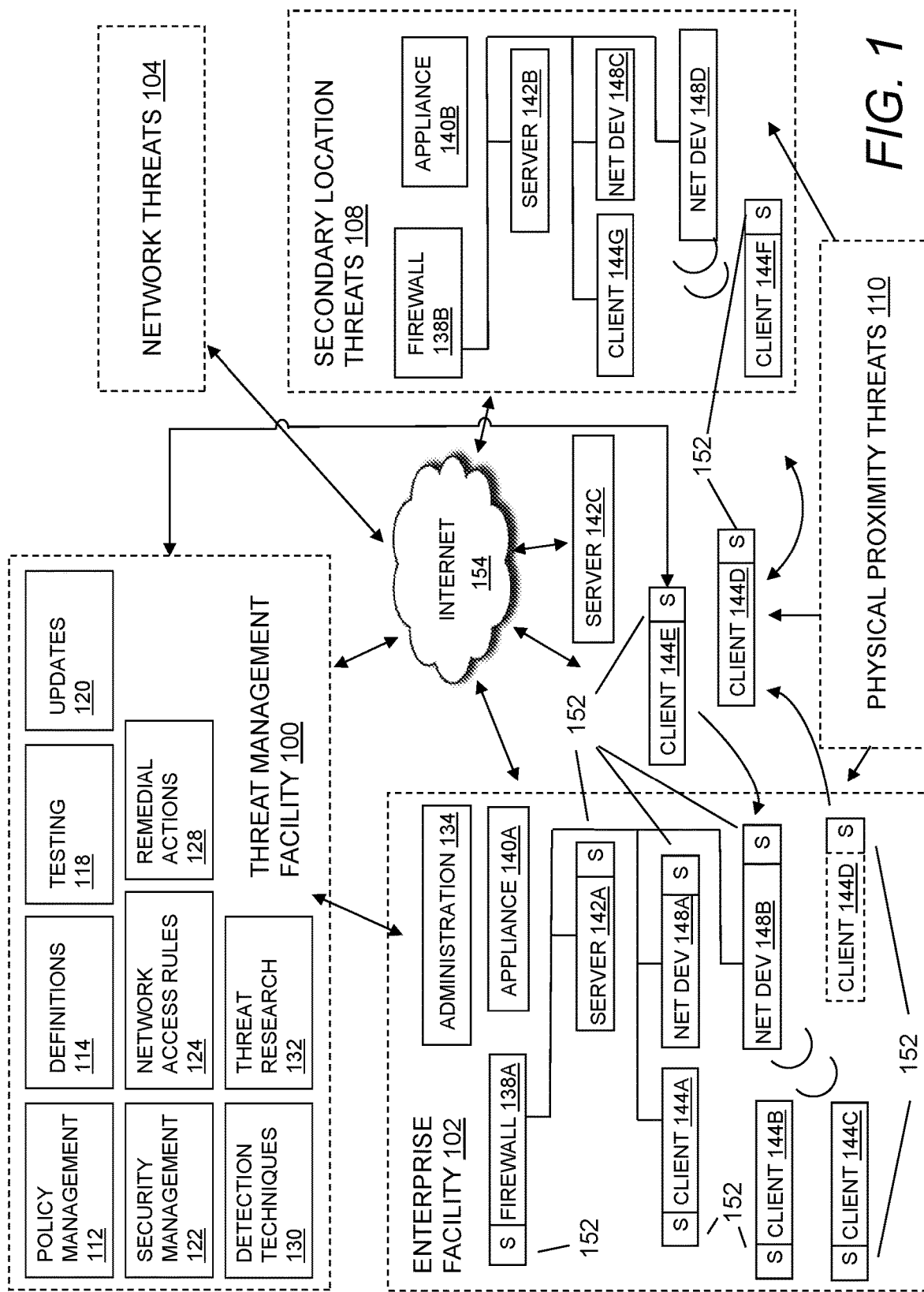
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

The security management facility 122 may provide reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

The threat management facility 100 may also provide for the removal of applications that potentially interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security facility 122 and policy management facility 112 may push information to the enterprise facility 102 network and/or client facility. The enterprise facility 102 network and/or client facility may also or instead pull information from the security facility 122 and policy management facility 112 network server facilities 142, or there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

A definition management facility 114 may provide timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility containing. For example, the information sent by the network access rules facility 124 may be a data file. The data file may contain a number of commands, definitions, instructions, or the like to be parsed and acted upon through the remedial action facility 128, or the like. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may retrieve predefined rule sets from a remote provider of a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may perform or initiate a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a personal digital assistant or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURT, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to a brief discussion of an example of a computer system that may be used for any of the entities and facilities described above.

Figure 2:
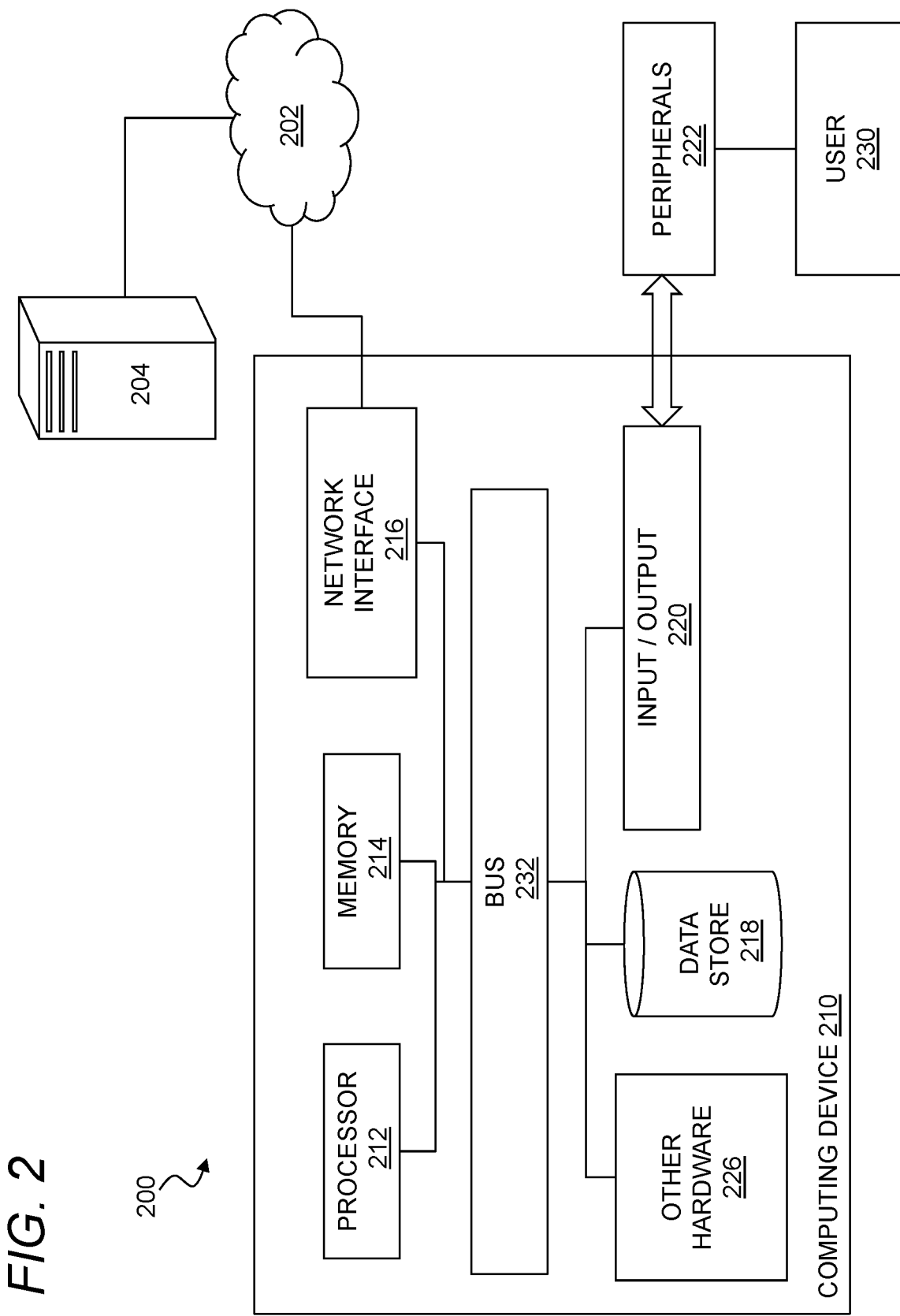
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
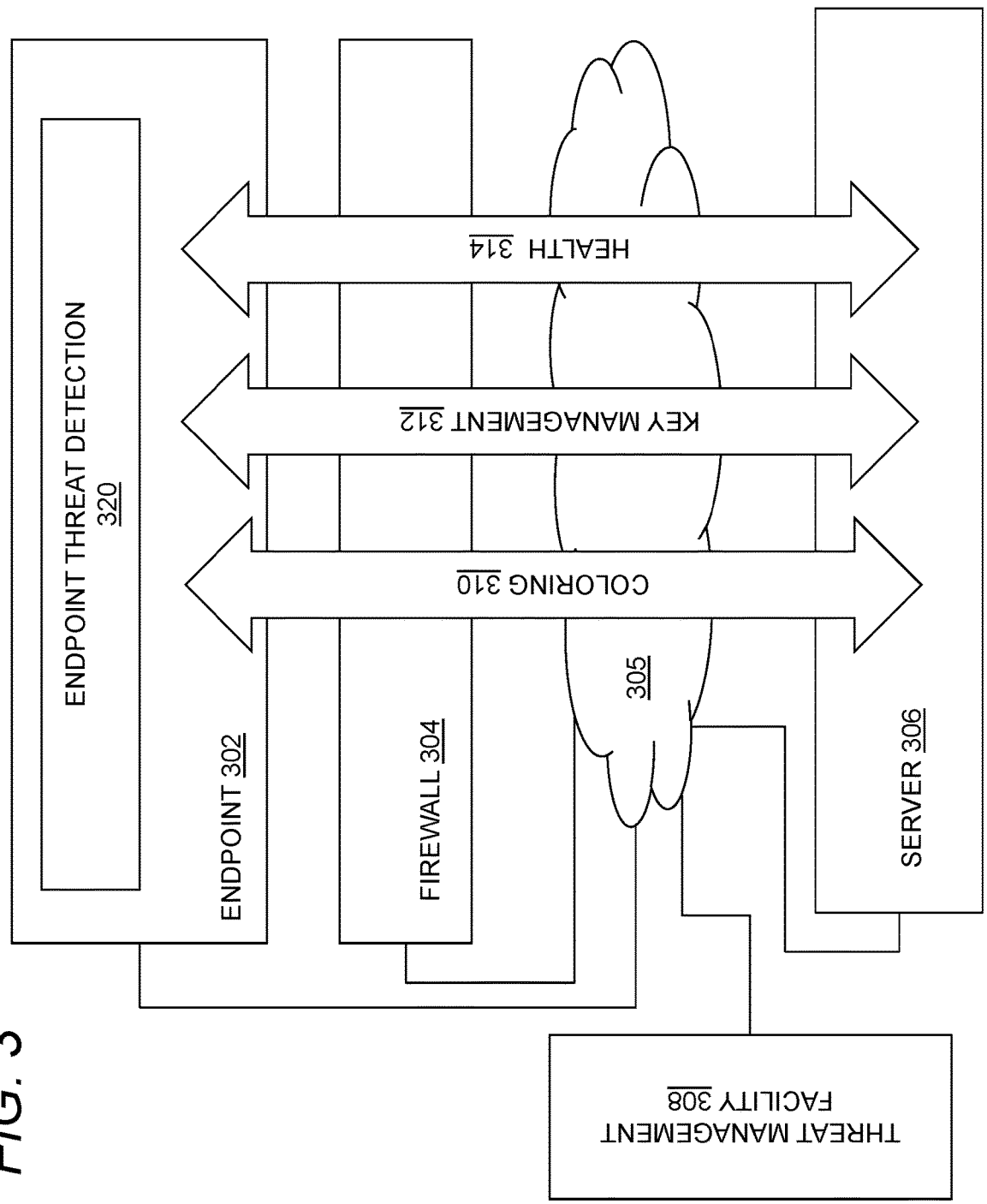
FIG. 3 illustrates a threat management system.

FIG. 3 illustrates a threat management system according to some implementations. In general, the system 300 may include an endpoint 302, a firewall 304, a server 306, and a threat management facility 308 coupled to one another directly or indirectly through a data network 305, all as generally described above.

Each of the entities depicted in FIG. 3 may, for example, be implemented on one or more computing devices such as the computing device described above with reference to FIG. 2. A number of systems may be distributed across these various components to support threat detection, such as a coloring system 310, a key management system 312 and an endpoint health system 314, each of which may include software components executing on any of the foregoing system components, and each of which may communicate with the threat management facility 308 and an endpoint threat detection agent 320 executing on the endpoint 302 to support improved threat detection and remediation.

The coloring system 310 may be used to label or 'color' software objects for improved tracking and detection of potentially harmful activity. The coloring system 310 may, for example, label files, executables, processes, network communications, data sources, and so forth. A variety of techniques may be used to select static and/or dynamic labels for any of these various software objects, and to manage the mechanics of applying and propagating coloring information as appropriate. For example, a process may inherit a color from an application that launches the process. Similarly and file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 310 as contemplated herein. A suitable coloring system is described in greater detail below with reference to FIG. 4.

The key management system 312 may support management of keys for the endpoint 302 in order to selectively permit or prevent access to content on the endpoint 302 on a file-specific basis, a process-specific basis, an application-specific basis, a user-specific basis, or any other suitable basis in order to prevent data leakage, and in order to support more fine-grained and immediate control over access to content on the endpoint 302 when a security compromise is detected. Thus for example, if a particular process executing on the endpoint is compromised, or potentially compromised or otherwise under suspicion, access by that process may be blocked (e.g., with access to keys revoked) in order to prevent, e.g., data leakage or other malicious activity. A suitable key management system useful in this context is described in greater detail below with reference to FIG. 5.

The endpoint health system 314 may be used to provide periodic or aperiodic information from the endpoint 302 or other system components about system health, security, status, and so forth. The endpoint health system 314 may thus in general include a health status report system for the endpoint 302, such as through the use of a heartbeat system or the like. A heartbeat may be encrypted or plaintext, or some combination of these, and may be communicated unidirectionally (e.g., from the endpoint 308 to the threat management facility 308) or bidirectionally (e.g., between the endpoint 302 and the server 306, or any other pair of system components) on any useful schedule. A suitable heartbeat system that can be used as part of the endpoint health system 314 is described in greater detail below with reference to FIG. 6.

In general, these various monitoring and management systems may cooperate to provide improved threat detection and response. For example, the coloring system 310 may be used to evaluate when a particular process is potentially opening inappropriate files, and a potential threat may be confirmed based on an interrupted heartbeat from the endpoint health system 314. The key management system 312 may then be deployed to revoke access by the process to certain resources (e.g., keys or file) so that no further files can be opened, deleted or otherwise modified. More generally, the cooperation of these systems enables a wide variety of reactive measures that can improve detection and remediation of potential threats to an endpoint.

Figure 4:
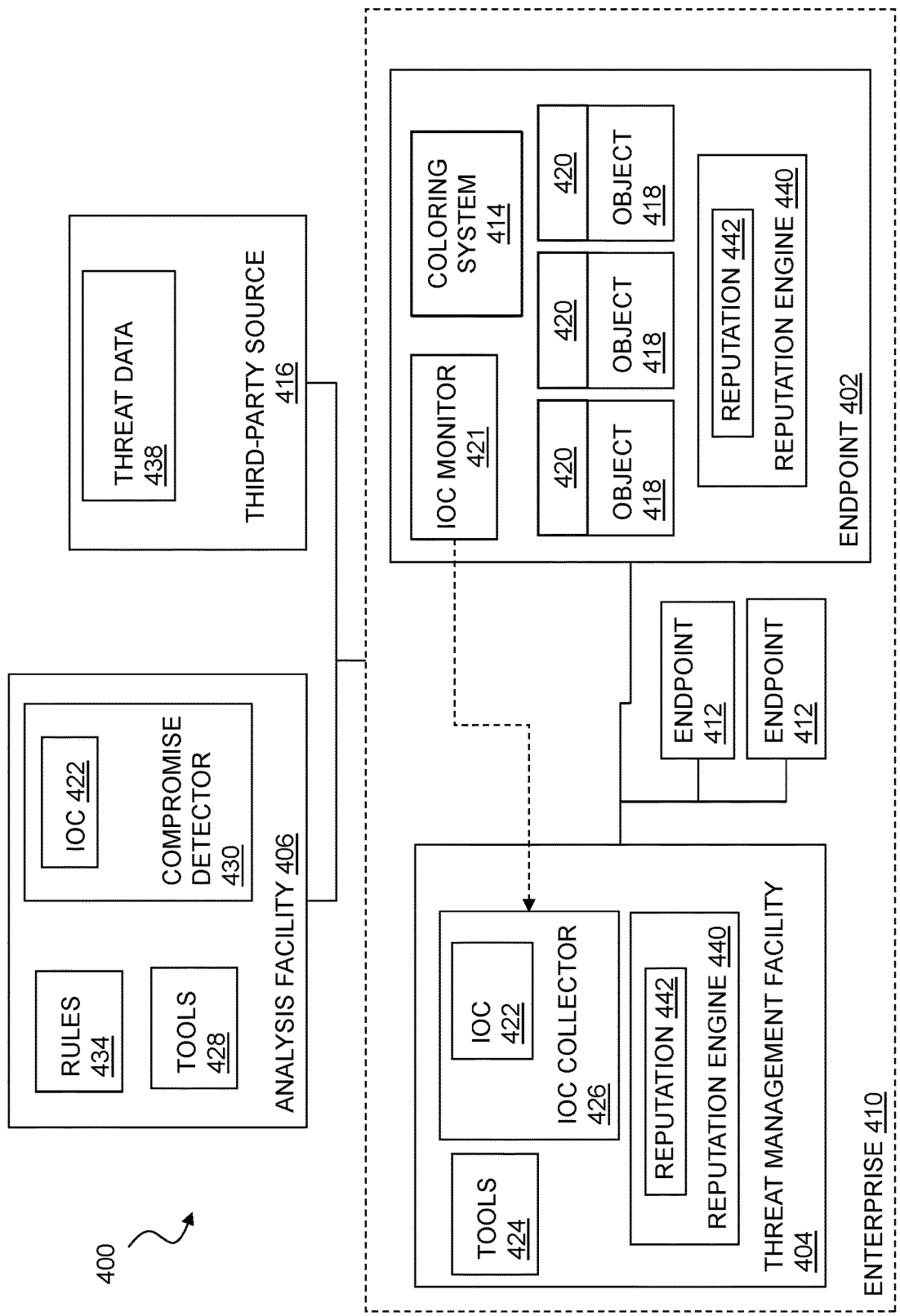
FIG. 4 illustrates a system for behavioral tracking, coloring, and generation of indications of compromise (IOCs).

FIG. 4 illustrates a system for behavioral tracking, coloring, and generation of indications of compromise (IOCs). In general, the system 400 may include a number of entities participating in a threat management process such as any of the entities and threat management processes described herein. The threat management process may for example employ techniques such as behavioral tracking, encryption, endpoint recording, reputation-based threat detection, behavioral-based threat detection, signature-based threat detection, and combinations of the foregoing, or any other suitable techniques for detecting threats to endpoints in an enterprise.

In general, the system 400 may include a number of endpoints 402, 412 and a threat management facility 404 in an enterprise 410, such as any of the enterprises described herein. An external analysis facility 406 may analyze threat data and provide rules and the like for use by the threat management facility 404 and endpoints 402, 412 in managing threats to the enterprise 410. The threat management facility 404 may reside in locally (e.g., a part of, embedded within, or locally coupled to the endpoint 402), a virtual appliance (e.g., which could be run by a protected set of systems on their own network systems), a private cloud, a public cloud, and so forth. The analysis facility 406 may store locally-derived threat information. The analysis facility 406 may also or instead receive threat information from a third party source 416 such as MITRE Corporation or any other public, private, educational or other organization that gathers information on network threats and provides analysis and threat detection information for use by others. Each of these components may be configured with suitable programming to participate in the various threat detection and management techniques contemplated herein. The threat management facility 404 may monitor any stream of data from an endpoint 402 exclusively, or use the full context of intelligence from the stream of all protected endpoints 402, 412 or some combination of these.

The endpoint 402 may be any of the endpoints described herein, or any other device or network asset that might join or participate in the enterprise 410 or otherwise operate on an enterprise network. This may, for example, include a server, a client such as a desktop computer or a mobile computing device (e.g., a laptop computer or a tablet), a cellular phone, a smart phone, or other computing device suitable for participating in the enterprise 410.

In general, the endpoint 402 may include any number of computing objects such as an object 418 labeled with a descriptor 420. While the term object has a number of specific meanings in the art, and in particular in object-oriented programming, it will be understood that the term 'object' as used herein is intended to be significantly broader, and may include any data, process, file or combination of these including without limitation any process, application, executable, script, dynamic linked library, file, data, database, data source, data structure, function, resource locator (e.g., uniform resource locator (URL) or other uniform resource identifier (URI)), or the like that might be manipulated by one of the computing devices described herein.

An object 418 may also or instead include a remote resource, such as a resource identified in a URL. That is, while the objects 418 in FIG. 4 are depicted as residing on the endpoint 402, an object 418 may also reside elsewhere in the system 400, while still being labeled with a descriptor 420 and tracked by the monitor 421 of the endpoint 402. The object 418 may be an item that is performing an action or causing an event, or the object 418 may be an item that is receiving the action or result of an event (i.e., the item in the system 400 being acted upon).

Where the object 418 is data or includes data, the object 418 may be encrypted or otherwise protected, or the object 418 may be unencrypted or otherwise unprotected. The object 418 may be a process or other computing object that performs an action, which may include a single event or a collection or sequence of events taken by a process. The object 418 may also or instead include an item such as a file or lines of code that are executable to perform such actions. The object 418 may also or instead include a computing component upon which an action is taken, e.g., a system setting (e.g., a registry key or the like), a data file, a URL, or the like. The object 418 may exhibit a behavior such as an interaction with another object or component of the system 400.

In one aspect, objects 418 may be described in terms of persistence. The object 418 may, for example, be a part of a process, and remain persistent as long as that process is alive. The object 418 may instead be persistent across an endpoint 402 and remain persistent as long as an endpoint 402 is active or alive. The object 418 may instead be a global object having persistence outside of an endpoint 418, such as a URL or a data store. In other words, the object 418 may be a persistent object with persistence outside of the endpoint.

Although many if not most objects 418 will typically be benign objects forming a part of a normal, operating endpoint, an object 418 may contain software associated with an advanced persistent threat (APT) or other malware that resides partially or entirely on the endpoint 402. The associated software may have reached the endpoint 402 in a variety of ways, and may have been placed manually or automatically on the endpoint 402 by a malicious source. It will be understood that the associated software may take any number of forms and have any number of components. For example, the associated software may include an executable file that can execute independently, or the associated software may be a macro, plug-in, or the like that executes within another application. Similarly, the associated software may manifest as one or more processes or threads executing on the endpoint 402. Further, the associated software may install from a file on the endpoint 402 (or a file remote from the endpoint 402), and the associated software may create one or more files such as data files or the like while executing. Associated software should be understood to generally include all such files and processes except where a specific file or process is more specifically noted.

A threat such as an APT may also take the form of an attack where no altered or additional software is directly added or modified on the endpoint 402. Instead, an adversary may reuse existing software on the system 400 to perform the attacks. It is for this reason that simply scanning for associated software may be insufficient for the detection of APTs and it may be preferable to detect APTs based on the behavior of the software and associated objects 418 that are used by, for, and with that software.

An object coloring system 414 may apply descriptors 420 to objects 418 on the endpoint 402. This may be performed continuously by a background process on the endpoint 402, or it may occur whenever an object 418 is involved in an action, such as when a process makes a call to an application programming interface (API) or takes some other action, or when a URL is used to initiate a network request, or when a read or a write is performed on data in a file. This may also or instead include a combination of these approaches as well as other approaches, such as by pre-labeling a file or application when it is moved to the endpoint 402, or when the endpoint 402 is started up or instantiated. In general, the object coloring system 414 may add, remove or change a color at any location and at any moment that can be practicably instrumented on a computer system.

As noted above, the term 'object' as used herein is intended to include a wide range of computing objects and as such, the manner in which particular objects 418 are labeled or 'colored' with descriptors 420 may vary significantly. Any object 418 that is performing an action may be colored at the time of and/or with a label corresponding to the action, or likewise any object 418 that is the target of the action may be colored at the time that it is used and/or with a label corresponding to a process or the like using the object 418. Furthermore, the operating system runtime representation of the object 418 may be colored, or the persistent object outside of the operating system may be colored (as is the case for a File Handle or File Object within the operating system or the actual file as stored in a file system), such as within an encryption header or other header applied to the file, or as part of a directory attribute or any other persistent location within the file or file system. A former coloring may be ephemerally tracked while the operating system maintains the representation and the latter may persist long after any reboots of the same operating system and likewise have meaning when read or used by other endpoints 402. For processes, each file handle may be supplemented with a pointer or other mechanism for locating a descriptor 420 for a particular object 420 that is a process. More specifically, each object 418 may be colored in any manner suitable for appending information to that object 418 so that the corresponding descriptor 420 can be retrieved and, where appropriate, updated.

The coloring system 414 may apply any suitable rules for adding and changing descriptors 420 for objects 418. For example, when a process with a certain descriptor accesses data with a different descriptor, the descriptor for the process may be updated to correspond to the data, or the descriptor for the data may be updated to correspond to the process, or some combination of these. Any action by or upon an object 418 may trigger a coloring rule so that descriptors 420 can be revised at any relevant time(s) during processing.

A descriptor 420 may take a variety of forms, and may in general include any information selected for relevance to threat detection. This may, for example, be a simple categorization of data or processes such as trusted or untrusted. For example, in one embodiment described herein, data and processes are labeled as either 'IN' (e.g., trusted) or 'OUT'

(e.g., untrusted). The specific content of the label is unimportant, and this may be a binary flag, text string, encrypted data or other human-readable and/or machine-readable identifier, provided that the descriptor 420 can facilitate discrimination among labeled files—in this example, between trusted objects 418 and untrusted objects 418 so that, e.g., trusted data can be selectively decrypted or encrypted for use with trusted processes. Similarly, data may be labeled as corporate data or private data, with similar type-dependent processing provided. For example, private data may be encrypted with a key exclusively controlled by the data owner, while corporate data may be encrypted using a remotely managed key ring for an enterprise operated by the corporation.

In another aspect, the descriptor 420 may provide a multi-tiered or hierarchical description of the object 418 including any information useful for characterizing the object 418 in a threat management context. For example, in one useful configuration the descriptor 420 may include a type or category, static threat detection attributes, and an explicit identification. The type or category for the object 418 may be any category or the like that characterizes a general nature or use of the object 418 as inferred from behavior and other characteristics. This may, for example, include categories such as 'game,' 'financial,' 'application,' 'electronic mail,' 'image,' 'video,' 'browser,' 'antivirus,' and so forth. The category may be more granular, or may include hierarchical categories such as 'application:spreadsheet,' 'application:word_processing,' and so forth. Such colors may be directly inferred from a single action, a sequence of actions, or a combination of actions and other colors, including, e.g., colors of processes and files related to a particular action, or other objects 418 that provide context for a particular action or group of actions. One or more colors may also or instead be explicitly provided by a user or a process, or otherwise automatically or manually attributed to computer objects as contemplated herein.

The static threat detection attributes may be any readily ascertainable characteristics of the object 418 useful in threat detection. This may, for example, include an antivirus signature, a hash, a file size, file privileges, a process user, a path or directory, declarations of permissions, an access (e.g., a resource access, or an API access), and so forth. Static threat detection attributes may also include attributes that are derived by or supplied from other sources. For example, static threat detection attributes may include a reputation for an object 418, which may be expressed in any suitable or useful level of granularity such as with discrete categories (trusted/untrusted/unknown) or with a numerical score or other quantitative indicator. The explicit identification may, in general, be what an object 418 calls itself, e.g., a file name or process name.

Some actions may transfer colors from a subject of the action to the target of the action. For example, when a process creates sub-processes, the sub-processes may inherit the colors of its parent(s). By way of another example, when a process is initially loaded from an executable, it may inherit the color(s) stored in the file system for or with the executable.

In general, the descriptor 420 may be provided in any suitable format. The descriptor 420 may for example be formed as a vector of binary flags or other attributes that form the 'color' or description of an object 418. The descriptor 420 may also, where appropriate, include scalar quantities for certain properties. For example, it may be relevant how many times a system file was accessed, how many file handles a process has open, how many times a remote resource was requested or how long a remote resource is connected, and this information may be suitably encoded in the descriptor 420 for use in coloring objects with the coloring system 414 and applying rules for IOC detection by the IOC monitor 421.

An indication of compromise (IOC) monitor 421 may be provided to instrument the endpoint 402 so that any observable actions by or involving various objects 418 can be detected. As with the coloring system 414, it will be understood that the types of observable actions will vary significantly, and the manner in which the endpoint 402 is instrumented to detect such actions will depend on the particular type of object 418. For example, for files or the like, an API for a file system may be used to detect reads, writes, and other access (e.g., open, read, write, move, copy, delete, etc.), and may be configured to report to or otherwise initiate monitoring of the action taken with the file through the file system. As another example, kernel objects may be instrumented at the corresponding object handle or in some other manner. As a further example, a kernel driver may be used for intercepting a process startup. While a wide variety of objects are contemplated herein, one of ordinary skill in the art may readily create suitable instrumentation for any computing object so that it may be monitored by the IOC monitor 421.

It will be noted that suitable instrumentation may be coded for a variety of functions and circumstances. For example, instrumentation may usefully track requests for network access or other actions back to a particular application or process, or data payloads back to a particular file or data location. One of ordinary skill in the art can readily implement suitable traces and/or logging for any such information that might be useful in a particular IOC monitoring operation.

In general, the IOC monitor 421 applies rules to determine when there is an IOC 422 suitable for reporting to a threat management facility 404. It will be understood that an endpoint 402 may, in suitable circumstances and with appropriate information, take immediate local action to remediate a threat. However, the monitor 421 may advantageously accumulate a sequence of actions, and still more advantageously may identify inconsistencies or unexpected behavior within a group of actions with improved sensitivity by comparing descriptors 420 for various objects 418 involved in relevant actions and events. In this manner, rules may be applied based upon the descriptors 420 that better discriminate malicious activity while reducing the quantity and frequency of information that must be communicated to a remote threat management facility 404. At the same time, all of the relevant information provided by the descriptors 420 can be sent in an IOC 422 when communicating a potential issue to the threat management facility 404. For example, during the course of execution, a specific process (as evidenced by its observed actions) may be assigned color descriptors indicating that it is a browser process. Further, the specific process may be assigned an attribute indicating that it has exposed itself to external URLs or other external data. Subsequently, the same process may be observed to be taking an action suitable for an internal or system process, such as opening up shared memory to another process that has coloring descriptions indicating that it is a system process. When this last action is observed, an inconsistency in the various color descriptors between the subject of the action—the externally exposed browser process—and the target of the action may result in a well-defined IOC, which may be directly processed with immediate local action taken. The IOC may also or instead be reported externally as appropriate.

Thus, an endpoint 402 in an enterprise 410 may be instrumented with a coloring system 414 and monitor 421 to better detect potentially malicious activity using descriptors 420 that have been selected for relevance to threat detection along with a corresponding set of rules developed for the particular descriptors 420 that are being used to label or color various objects 418. By way of example, the object 418 may be a web browser that starts off being colored as a 'browser' and an 'internet facing' application. Based on this descriptor 420, a range of behaviors or actions may be considered normal, such as accessing remote network resources. However, if an object 418 colored with this descriptor 420 attempted to elevate privileges for a process, or to access a registry or system files, then this inconsistency in action may trigger a rule violation and result in an IOC 422.

In general, any action or series of actions that cumulatively invoke a particular reporting or action rule may be combined into an IOC 422 and communicated to the threat management facility 404. For example, an IOC 422 may include a malicious or strange behavior, or an indication of a malicious or strange behavior. The IOC 422 may be a normalized IOC that expresses one or more actions in a platform independent manner. That is, the IOC 422 may express a malicious behavior or suspected malicious behavior without reference to platform-specific information such as details of an operating system (e.g., iOS, MacOS, Windows, Android, Linux, and so forth), hardware, applications, naming conventions, and so forth. Thus, a normalized IOC may be suitable for identifying a particular threat across multiple platforms, and may include platform independent processes, actions, or behaviors, or may express such process, actions, or behaviors in a platform independent manner. The normalized IOC may be generated from the IOC 422, e.g., it may be a converted version of the IOC 422 suitable for use with multiple platforms, or it may simply be any IOC 422 that has been created in a platform independent form. Process colorization (i.e., using the coloring system 414) as described herein may be used to create a normalized IOC.

In general, a threat management facility 404 for the enterprise 410 may include an IOC collector 426 that receives the IOC 422 from the endpoint 402 and determines an appropriate action. This may include any suitable remedial action, or where one or more IOCs 422 are inconclusive, continued monitoring or increased monitoring as appropriate.

The threat management facility 404 may provide a variety of threat management or monitoring tools 424, any of which may be deployed in response IOCs 422 collected by the IOC collector 426. These tools 424 may include without limitation a scanning engine, whitelisting/blacklisting, reputation analysis, web filtering, an emulator, protection architecture, live protection, runtime detection, APT detection, network antivirus products, IOC detection, access logs, a heartbeat, a sandbox or quarantine system, and so forth.

The analysis facility 406 may provide a remote processing resource for analyzing malicious activities and creating rules 434 suitable for detecting IOCs 422 based on objects 420 and descriptors 420. It is generally contemplated that suitable attributes of certain descriptors 418 and one or more rules 434 may be developed together so that objects 418 can be appropriately labeled with descriptors 420 that permit invocation of rules 434 and creation of IOCs 422 at appropriate times. The analysis facility 406 may include a variety of analysis tools 428 including, without limitation, tools for regular expression, whitelisting/blacklisting, crowd sourcing, identifiers, and so forth. The analysis tools 428 may also or instead include information and tools such as URL look-ups, genotypes, identities, file look-up, reputations, and so forth. The analysis facility 406 may also provide numerous related functions such as an interface for receiving information on new, unknown files or processes, and for testing of such code or content in a sandbox on the analysis facility 406.

The analysis facility 406 may also or instead include a compromise detector 430, where the compromise detector 430 is configured to receive new threat information for analysis and creation of new rules and descriptors as appropriate, as well as corresponding remedial actions. The compromise detector 430 may include any tools described herein or otherwise known in the art for detecting compromises or evaluating new threats in an enterprise 410.

In general, a rule 434 may be manually created with corresponding human-readable semantics, e.g., where a process is labeled as a browser process or other category or type that can be interpreted by a human. It should, however, be appreciated that the compromise detector 430 may also be configured to automatically generate descriptors 420 and rules 434 suitable for distribution to a threat management facility 404 and an endpoint 402. In this latter mode, the meaning of a particular descriptor 420 may not have a readily expressible human-readable meaning. Thus, it will be understood that attributes selected for relevance to threat detection may include conventional attributes, as well as attributes without conventional labels or meaning except in the context of a particular, computer-generated rule for threat detection.

In general, the analysis facility 406 may be within an enterprise 410, or the analysis facility 406 may be external to the enterprise 410 and administered, for example, by a trusted third party. Further, a third-party source 416 may provide additional threat data 438 or analyses for use by the analysis facility 406 and the threat management facility 404. The third-party resource 416 may be a data resource that provides threat data 438 and analyses, where the threat data 438 is any data that is useful in detecting, monitoring, or analyzing threats. For example, the threat data 438 may include a database of threats, signatures, and the like. By way of example, the third-party resource 416 may be a resource provided by The MITRE Corporation.

The system 400 may include a reputation engine 440 storing a plurality of reputations 442. The reputation engine 440 may include a reputation management system for the generation, analysis, identification, editing, storing, etc., of reputations 442. The reputation engine 440 may include reputation-based filtering, which may be similar to the reputation filtering discussed above with reference to FIG. 1. The reputation engine 440 may be located on the threat management facility 404 or the endpoint 402 as shown in FIG. 4, or the reputation engine 440 may be located elsewhere in the system 400. The reputation engine 440 may receive an IOC 422 or a stream of IOCs 422, and may generate or utilize reputations 442 for the IOCs 422. The reputation engine 440 may also or instead receive actions, behaviors, events, interactions, and so forth, and may generate or utilize reputations 442 for any of the foregoing. The reputation engine 440 may generate or revise a reputation 442 based on behaviors, actions, events, interactions, IOCs 422, other reputations 442, a history of events, data, rules, state of encryption, colors, and so forth. The reputation engine 440 may utilize a third-party resource, e.g., for the third-party resource's reputation data.

The reputations 442 may include reputations for any of the objects 418 as described herein. In general, the reputations 442 may relate to the trustworthiness of the objects 418 or an attribute thereof (e.g., the source of the object 418, a behavior of the object 418, another object interacting with the object 418, and so forth). The reputations 442 may include lists of known sources of malware or known suspicious objects 418. The reputations 442 may also or instead include lists of known safe or trusted resources or objects 418. The reputations 442 may be stored in a reputations database included on the reputation engine 440 or located elsewhere in the system 400. The reputations 442 may be expressed in any suitable or useful level of granularity such as with discrete categories (e.g., trusted, untrusted, unknown, malicious, safe, etc.) or with a numerical score or other quantitative indicator. The reputations 442 may also be scaled.

In general, in the system 400 of FIG. 4, a malicious activity on the endpoint 402 may be detected by the IOC monitor 421, and a corresponding IOC 422 may be transmitted to the threat management facility 404 for remedial action as appropriate. The threat management facility 404 may further communicate one or more IOCs 422 to the analysis facility 406 for additional analyses and/or resolution of inconclusive results. Other details and variations are provided below. While the use of coloring and IOCs as contemplated herein can improve threat detection and remediation in a number of ways, the system 400 can be further improved with granular control over access to endpoint data using an encryption system. A system for key-based management of processes and files on an endpoint is now discussed in greater detail.

Figure 5:
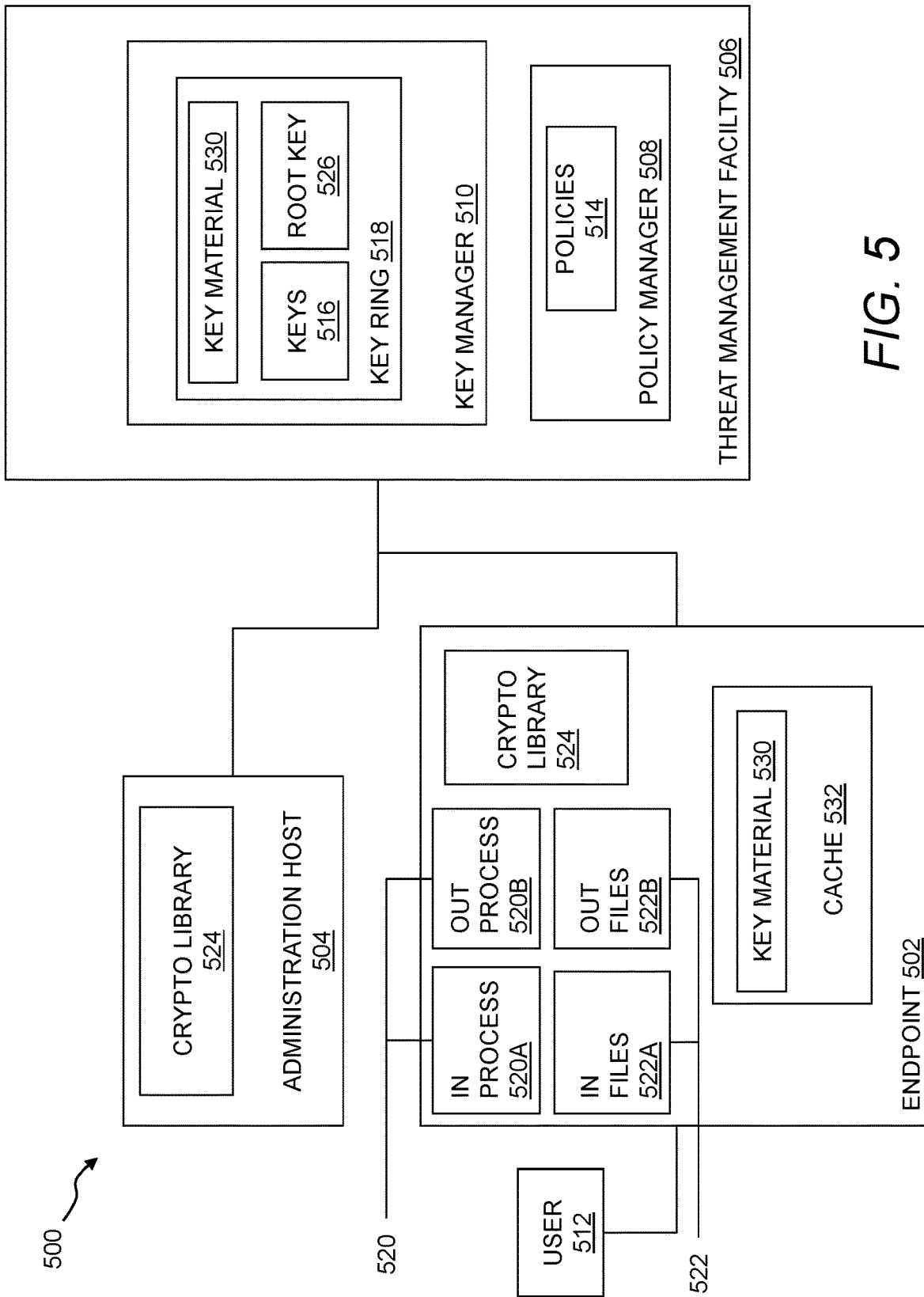
FIG. 5 illustrates a system for encryption management.

FIG. 5 illustrates a system for encryption management. Generally, the system 500 may include endpoints 502, an administration host 504, and a threat management facility 506, which may include policy manager 508 and key manager 510. The system 500 may provide for the management of users 512, policies 514, keys 516 (e.g., disposed on key rings 518), and endpoints 502 (e.g., from the administration host 504). The system 500 may utilize various storage and processing resources, which may be local, remote, virtual, disposed in a cloud, or the like.

The endpoints 502 may be any of the endpoints as described herein, e.g., with reference to the other figures. The endpoints 502 may also or instead include other end user devices and other devices to be managed. The endpoints 502 may include a web browser for use by the users 512, with supporting cryptographic functions implemented using cryptographic libraries in the web browser. The endpoints 502 may communicate with the other components of the system 500 using any suitable communication interface, which may include Secure Socket Layer (SSL) encryption, Hypertext Transfer Protocol Secure (HTTPS), and so forth for additional security.

The endpoints 502 may include objects as described herein. For example, the endpoints 502 may include processes 520 and files 522. The processes 520 may be labeled (e.g., by a coloring system using descriptors as described above) in such a manner that the process is 'IN,' where the process 520 is in compliance with policies 514 administered for the endpoint 502 from a remote threat management facility 506, or the process is 'OUT,' where the process 520 is out of compliance with a policy (or a number of policies) in the policies 514 for an enterprise. This may provide IN processes 520A and OUT processes 520B as shown in FIG. 5. The files 522 may be similarly labeled by a coloring system with descriptors that identify each file 522 as IN, where the file 522 complies with the policies 514 and is accordingly encrypted using, e.g., a remotely managed key ring 518, or the file is OUT, where the file 522 does not conform to the policies 514 and is accordingly not encrypted using the remotely managed key ring 518. This may provide IN files 522A and OUT files 522B as shown in FIG. 5. One skilled in the art will recognize that other objects of the endpoint 502 or other components of the system 500 may be labeled in a similar manner where they are either IN or OUT. By coloring objects in this manner and basing key access on the corresponding color, the "IN" software objects may operate in a protected environment that objectively appears to be in compliance with the policies 514. Other files and processes may still be used on the endpoint 502, but they will operate in an "OUT" or unprotected environment that cannot obtain access to any of the "IN" content or functionality.

In an implementation, the system 500 may include determining whether an endpoint 502 is IN or OUT or whether a component of the endpoint 502 is IN or OUT, which may be based upon a set of rules (e.g., the rules outlined herein) or policies such as the policies 514 described herein. In some aspects, if the entire endpoint 502 is OUT—that is, out of compliance with one or more policies 514, the endpoint 502 will not have key access or access to any protected content. Conversely, if the endpoint 502 is IN, the endpoint 502 may have access to protected content. Thus in one aspect, the notion of IN/OUT may be applied at an endpoint level, and data protection may be a consequence of endpoint protection. Endpoint protection may also or instead be applied at a more granular level, e.g., by determining whether executables, processes 520, files 522, etc., on the endpoint 502 are IN or OUT, which may be based upon rules or policies 514 as described herein.

The administration host 504 may include a web browser, which may include a cryptography library 524 and a web user interface (e.g., HTML, JavaScript, etc.). An administrator may utilize the web user interface to administer a key management system and perform administrative functions such as creating and distributing keys 516, establishing security policies, creating key hierarchies and rules, and so forth. The endpoint 502 may also include a cryptographic library 524 implementing cryptographic protocols for using key material in the key ring 518 to encrypt and decrypt data as needed.

The threat management facility 506 may include any of the threat management facilities or similar systems described herein. In general, the threat management facility 506 may include a policy manager 508 and key manager 510. Alternatively, one or more of the policy manager 508 and key manager 510 may be located elsewhere on a network.

The policy manager 508 may implement one or more policies 514, and maintain, distribute, and monitor the policies for devices in an enterprise. The policies 514 may include any policies 514 relating to secure operation of endpoints 502 in an enterprise. This may, for example, include hardware configuration policies, software configuration policies, communication policies, update policies, or any other policies relating to, e.g., the configuration of an endpoint 502, communications by an endpoint 502, software executing on an endpoint 502 and so forth. Policies 514 may include usage criteria based on, e.g., signatures, indications of compromise, reputation, user identity, and so forth. With respect to the key management system contemplated herein, the policies 514 may include a cryptographic protocol implementation, key servers, user procedures, and other relevant protocols, or these cryptographic protocols may be provided elsewhere for use by the policy manager 508. The policies 514 may also include any rules for compliance including those mentioned above or any other suitable rules or algorithms that can be applied to determine whether objects and components are 'IN' or 'OUT' as contemplated herein.

The key manager 510 may be part of the threat management facility 506, or it may be remotely managed elsewhere, e.g., in a remote cloud resource or the like. The key manager 510 may also or instead be disposed on the administration host 504 and one or more endpoints 502 in a manner independent of the threat management facility 506. In this manner, all cryptographic operations may be isolated from the threat management facility 506 and instead may be performed by a web browser or the like executing on the administration host 504 or an endpoint 502. The key manager 510 may manage the keys 516, including managing the generation, exchange, storage, use, and replacement of keys 516. The key manager 510 may include a key ring 518, where the keys 516 are disposed on the key ring 518 using one root key 526. The key manager 510 may also or instead include a variety of key management and other secure processes, including without limitation, administrator registration, establishing trust to endpoints 502, key distribution to endpoints 502, policy deployment, endpoint status reporting, and local key backup.

The users 512 may have full access to encrypted data. Alternatively, the users 512 may have limited access to encrypted data, or no access to encrypted data. Access may be limited to users 512 using endpoints 502 that are deemed 'IN' by the system, as well as to processes 520 that are IN, as further described herein.

The keys 516 may include cryptographic keys in a cryptosystem, i.e., decryption keys. In one aspect, the keys 516 may be disposed on one key ring 518 using one root key 526. In general, the keys 516 may be created and managed using, e.g., symmetric key technology, asymmetric key technology, or any other key technology or combination of key technologies suitable for securing data in an enterprise including, for example the Data Encryption Standard (DES), Triple DES, Advanced Encryption Standard (AES), elliptic curve cryptography (ECC), and so forth. The cryptosystem may also or instead include any suitable public key infrastructure or the like supporting the distribution and use of keys for encryption, digital signatures, and so forth.

The key ring 518 may facilitate simplified management of the system 500. For example, by reducing the data protection system down to a single key ring 518, the system can eliminate or reduce the overhead for management of keys 516. In one aspect, all of the data on a key ring 518 is protected by one root key 526. By reducing the data protection system down to a single key ring 518 protected by one root key 526, all privileged users 512 on uncompromised platforms can have access to all protected data. In this embodiment, data is either 'IN' (i.e., encrypted), or it's 'OUT' (i.e., not encrypted). In one aspect, the default system does not include any additional level or granularity of access control.

The cryptography library 524 may be disposed on the administration host 504 as shown in FIG. 5. The cryptography library 524 may also be disposed on the endpoint 502, e.g., in a web browser, or it may be disposed on another component of the system 500, or any combination of these. The cryptographic library 524 may be installed by an administrator. In general, key material 530 from the key ring 518 may be stored in a cache 532 on the endpoint 502 within any suitable memory on the endpoint 502 for use in encryption and decryption as contemplated herein. As noted above, an enterprise that systematically uses coloring and indications of compromise can be improved through the use of a synchronized or integrated key management system as contemplated herein. This system may be still further improved with the addition of a heartbeat system that communicates heartbeats from an endpoint containing health and status information about the endpoint. A suitable heartbeat system is now described in greater detail.

Figure 6:
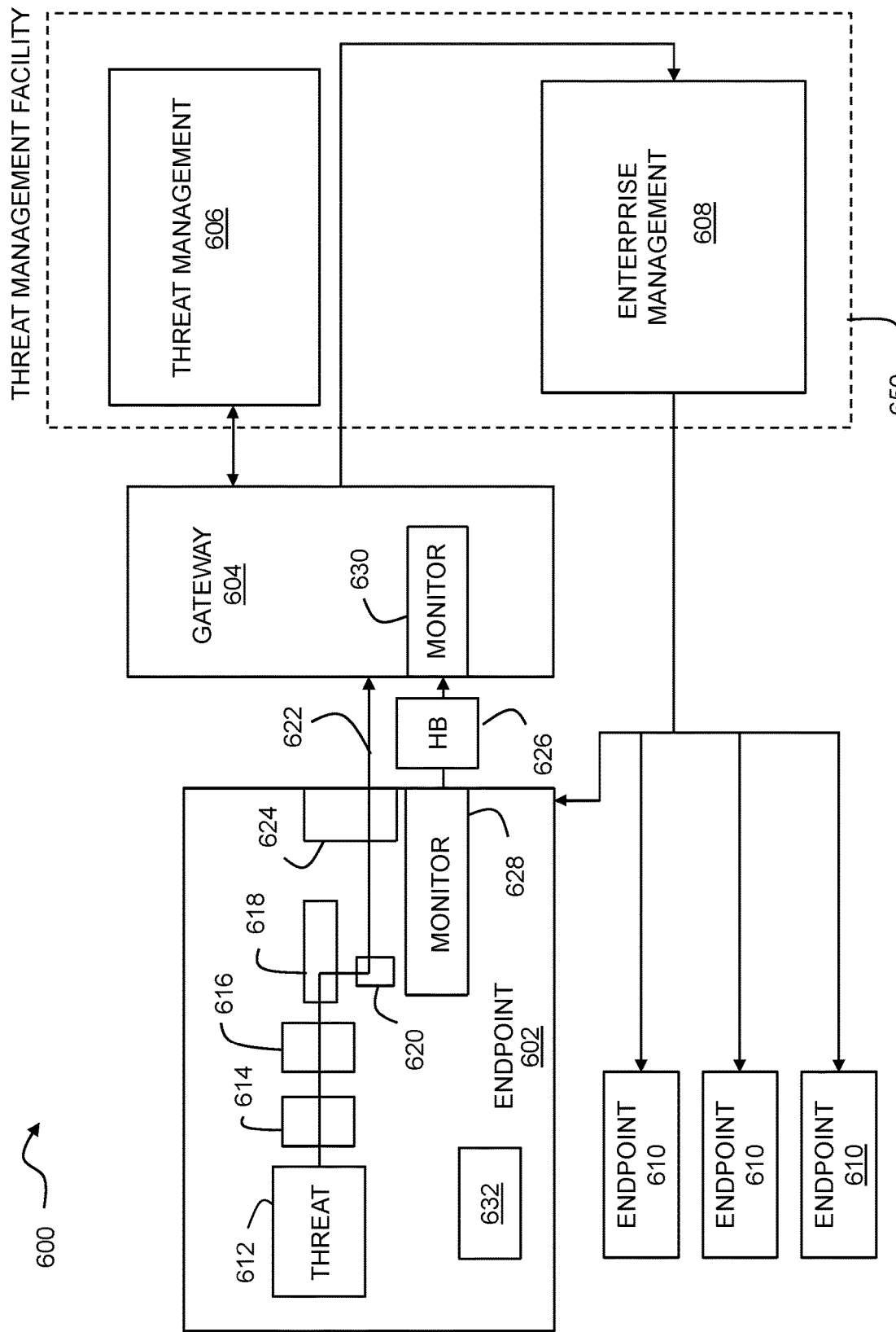
FIG. 6 illustrates a threat management system using heartbeats.

FIG. 6 illustrates a threat management system using heartbeats. In general, a system 600 may include an endpoint 602, a gateway 604, a threat management system 606, and an enterprise management system 608 that manages an enterprise including the endpoint 602, the gateway 604, and one or more additional endpoints 610. Each of these components may be configured with suitable programming to participate in the detection and remediation of an advanced persistent threat (APT) or other malware threat as contemplated herein.

The endpoint 602 may be any of the endpoints described herein, or any other device or network asset that might join or participate in an enterprise network. The endpoint 602 may contain a threat 612 such as an advanced persistent threat, virus, or similar malware that resides on the endpoint 602. The threat 612 may have reached the endpoint 602 in a variety of ways, and may have been placed manually or automatically on the endpoint 602 by a malicious source. It will be understood that the threat 612 may take any number of forms and have any number of components. For example, the threat 612 may include an executable file that can execute independently, or the threat 612 may be a macro, plug-in, or the like that executes within another application. Similarly, the threat 612 may manifest as one or more processes or threads executing on the endpoint 602. The threat 612 may install from a file on the endpoint 602 or a file remote from the endpoint 602, and the threat 612 may create one or more other files such as data files or the like while executing. Advanced persistent threats can be particularly difficult to detect and remediate, and the systems and methods contemplated herein can advantageously provide improved sensitivity to such threats, as well as enabling improved remediation strategies. However, the systems and methods contemplated herein may also or instead be used to detect and remediate other types of malware threats. As such, in this context references to a particular type of threat (e.g., an advanced persistent threat) should be understood to generally include any type of malware or other threat to an endpoint or enterprise unless a more specific threat or threat type is explicitly provided or otherwise clear from the context.

The threat 612 may be analyzed by one or more threat countermeasures on the endpoint 602 such as a whitelisting filter 614 that approves each item of code before executing on the endpoint 602 and prevents execution of non-whitelisted code. The endpoint 602 may also include an antivirus engine 616 or other malware detection software that uses any of a variety of techniques to identify malicious code by reputation or other characteristics. A runtime detection engine 618 may also monitor executing code to identify possible threats. More generally, any of a variety of threat detection techniques may be applied to the threat 612 before and during execution. In general, a threat 612 may evade these and other security measures and begin executing as a process 620 on the endpoint 602.

Network traffic 622 from the process 620 may be monitored and logged by a traffic monitor 624 on the endpoint 602. The traffic monitor 624 may, for example, logs a time and a source of each network request from the endpoint 602. Where the endpoint 602 is within an enterprise network, the network traffic 622 may pass through the gateway 604 in transit to a data network such as the Internet. While the gateway 604 may be logically or physically positioned between the endpoint 602 and an external data network, it will be understood that other configurations are possible. For example, where the endpoint 602 is associated with an enterprise network but operating remotely, the endpoint 602 may form a VPN or other secure tunnel or the like to the gateway 604 for use of a threat management system 606, enterprise management system 608, and any other enterprise resources.

The endpoint 602 may use a heartbeat 626 to periodically and securely communicate status to the gateway 604. The heartbeat 626 may be created by a health monitor 628 within the endpoint 602, and may be transmitted to a remote health monitor 630 at the gateway 604. The health monitor 628 may monitor system health in a variety of ways, such as by checking the status of individual software items executing on the endpoint 602, checking that antivirus and other security software is up to date (e.g., with current virus definition files and so forth) and running correctly, checking the integrity of cryptographic key stores, checking for compliance with enterprise security policies, and checking any other hardware or software components of the endpoint 602 as necessary or helpful for health monitoring. The health monitor 628 may thus condition the issuance of a heartbeat 626 on a satisfactory status of the endpoint 602 according to any suitable criteria, enterprise polices, and other evaluation techniques.

The heartbeat 626 may be secured in any suitable manner so that the health monitor 630 can reliably confirm the source of the heartbeat 626 and the status of the endpoint 602. To this end, the heartbeat 626 may be cryptographically signed or secured using a private key so that the monitor 630 can authenticate the origin of the heartbeat 626 using a corresponding public key. In one aspect, the heartbeat 626 may include a combination of plaintext information and encrypted information, such as where the status information for the endpoint is provided in plaintext while a digital signature for authentication is cryptographically secured. In another aspect, all of the information in the heartbeat 626 may be encrypted.

In one aspect, a key vault 632 may be provided on the endpoint to support cryptographic functions associated with a secure heartbeat. An obfuscated key vault 632 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 632, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

A robust heartbeat 626 may usefully provide defensive mechanisms against reverse engineering of obfuscated content (e.g., the private key material stored in key vault 632, the code used to validate the correct running of the remainder of the systems as part of the heartbeat 626 code itself) and any anti-lifting protections to prevent malware from directly using the endpoint 602 (or the health monitor 628 on the endpoint 602) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 626 code itself.

A variety of useful techniques may be employed to improve security of the key vault 632 and the heartbeat 626. For example, the system may use domain shifting so that original key material is inferred based on hardware and software properties readily available to the key vault 632, and to ensure that key material uses non-standard algorithms. Software properties may, for example, include readily determined system values such as hashes of nearby code. In another aspect, the keys may be domain shifted in a manner unique to the endpoint 602 so that the manner of statistical validation of call stacks and core software is unique to the endpoint 602. Further the key vault may be provisioned so that a public key stored in the key vault 632 is signed with a certificate (or into a certificate chain) that can be externally validated by a network appliance or other trusted third party or directly by the health monitor 628 or remote health monitor 630.

The heartbeat 626 may encode any useful status information, and may be transmitted from the endpoint 602 on any desired schedule including any periodic, aperiodic, random, deterministic, or other schedule. Configured in this manner, the heartbeat 626 can provide secure, tamper-resistant instrumentation for status of the endpoint 602, and in particular an indication that the endpoint 602 is online and uncompromised. A delay or disappearance of the heartbeat 626 from the endpoint 602 may indicate that the endpoint 602 has been compromised; however this may also simply indicate that the endpoint 602 has been powered off or intentionally disconnected from the network. Thus, other criteria may be used in addition to the disappearance or interruption of the heartbeat 626 to more accurately detect malicious software. Some such techniques are described below, but it will be understood that this may include any supplemental information that might tend to make an attack on the endpoint 602 more or less likely. For example, if the heartbeat 626 is interrupted but the endpoint 602 is still sourcing network traffic, then an inference might suitably be made that the endpoint 602 is compromised.

The threat management system 606 may, in general, be any of the threat management systems described herein. The enterprise management system 608 generally provides tools and interfaces for administration of the enterprise and various endpoints 610 and other resources or assets attached thereto. It will be understood that, the functions of the threat management system 606 and the enterprise management system 608 may vary, and general threat management and administration functions may be distributed in a variety of ways between and among these and other components. This is generally indicated in FIG. 6 as a threat management facility 650 that includes the threat management system 606 and the enterprise management system 608. It will be understood that either or both of these system may be administered by third parties on behalf of the enterprise, or managed completely within the enterprise, or some combination of these, all without departing from the scope of this disclosure. It will similarly be understood that a reference herein to a threat management facility 650 is not intended to imply any particular combination of functions or components, and shall only be understood to include such functions or components as explicitly stated in a particular context, or as necessary to provide countermeasures for malware (e.g., advanced persistent threats) as contemplated herein.

Figure 7:
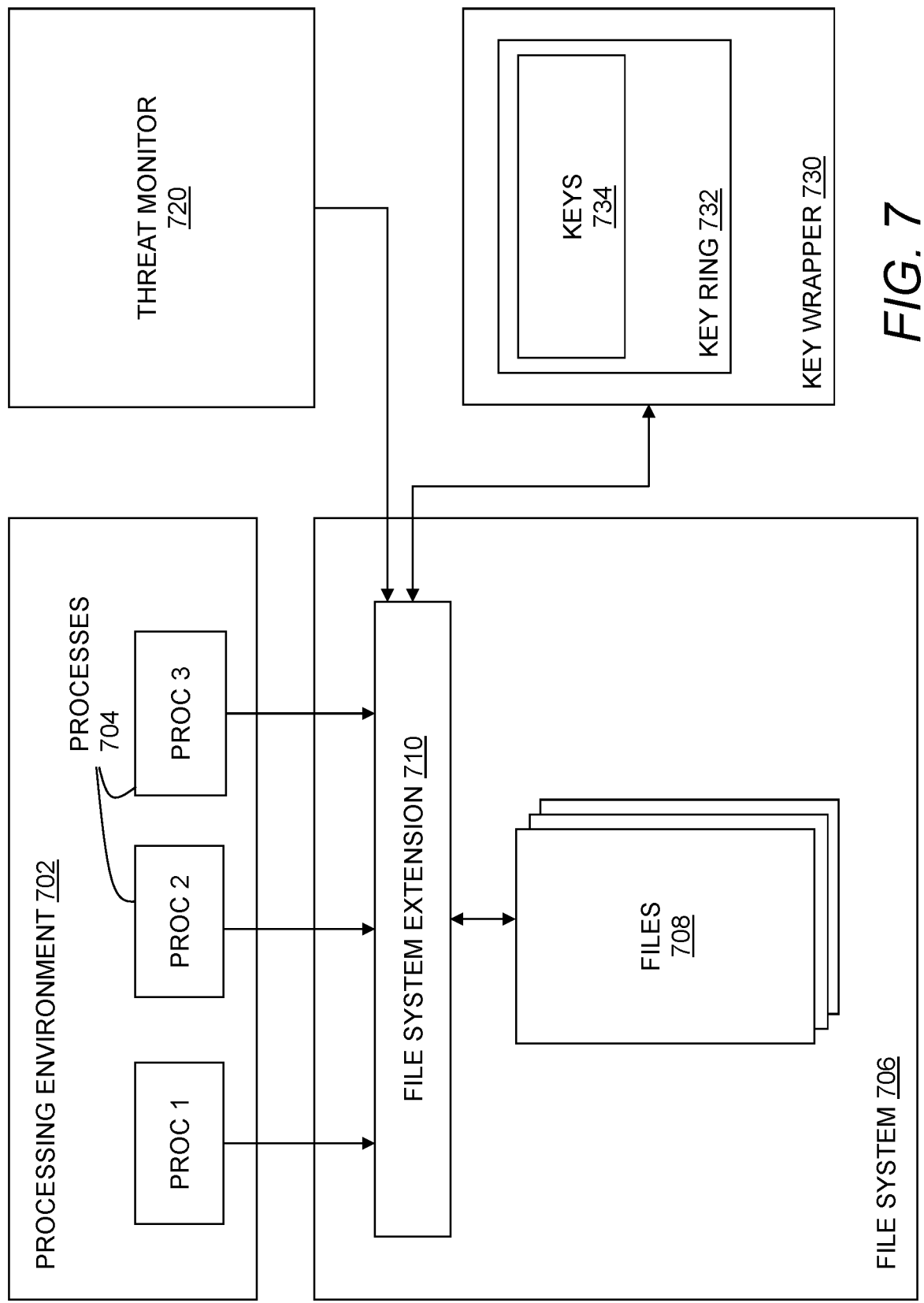
FIG. 7 shows an architecture for endpoint protection in an enterprise network security system.

FIG. 7 shows an architecture for endpoint protection in an enterprise network security system. In general, an endpoint may include a processing environment 702, a file system 706 (such as a data storage system or the like), a threat monitor 720 and a key wrapper 730.

The processing environment 702 may, for example, be any environment such as an operating system or the like suitable for executing one or more processes 704.

Each process 704 may be an instance of a software application, computer program, portion of a computer program or other code executing within the processing environment 702. A process 704 may execute, e.g., on a processor, group of processors, or other processing circuitry or platform for executing computer-executable code. A process 704 may include executable computer code, as well as an allocation of memory, file descriptors or handles for data sources and sinks, security attributes such as an owner and any associated permissions, and a context including the content of physical memory used by the process 704. A process 704 may be or may include one or more threads. More generally, a process 704 may include any code executing on an endpoint such as any of the endpoints described herein.

The file system 706 may include a data storage system or the like, e.g., where a data store including one or more files (e.g., the files 708 shown in the figure) is included as part of the data storage system. The file system 706 may be generally associated with an operating system that provides the processing environment 702, and serves as an intermediary between processes 704 executing in the processing environment 702 and one or more files 708 accessible to the endpoint. The file system 706 may provide a directory structure or other construct to facilitate organization of the files 708, and the file system 706 generally supports file functions such as creating, deleting, opening, closing, reading, writing, and so forth.

An extension 710 may be included in the file system 706 by modifying the operating system kernel. While other programming techniques may be employed to perform the functions of an extension 710 as contemplated herein, direct modifications to the operating system permit the extension 710 to operate transparently to the processing environment 702 and the processes 704 without requiring any modifications or adaptations. The extension 710 may, for example, be implemented as a file system filter (in a MICROSOFT WINDOWS environment) or a mount point to a directory (in an APPLE iOS environment). The extension 710 to the files system as contemplated herein performs two concurrent functions. First, the extension 710 communicates with a threat monitor 720 in order to receive updates on the security status and exposure status of the processes 704 or the endpoint. Second, the extension 710 communicates with a key wrapper 730 that provides key material for encrypting and decrypting data in the files 708. Finally, the extension 710 operates to conditionally provide encryption and decryption of the files 708 for the processes 704 based on a current security or exposure state, as described in greater detail below.

The threat monitor 720 may include any suitable threat monitoring, malware detection, antivirus program or the like suitable for monitoring and reporting on a security state of an endpoint or individual processes 704 executing thereon. This may include local threat monitoring using, e.g., behavioral analysis or static analysis. The threat monitor 720 may also or instead use reputation to evaluate the security state of processes 704 based on the processes 704 themselves, source files or executable code for the processes 704, or network activity initiated by the processes 704. For example, if a process 704 requests data from a remote URL that is known to have a bad reputation, this information may be used to infer a compromised security state of the endpoint. While a threat monitor 720 may operate locally, the threat monitor 720 may also or instead use remote resources such as a gateway carrying traffic to and from the endpoint, or a remote threat management facility that provides reputation information, malware signatures, policy information and the like for the endpoint and other devices within an enterprise such as the enterprise described above.

The threat monitor 720 may also or instead monitor the health of one or more of the system, an endpoint, a process 704, and so forth. The health monitoring may be used to provide periodic or aperiodic information from one or more system components about system health, security, status, and so forth. Implementations may include using the health monitoring for controlling access, e.g., to files 708, to keys 734, to key material for encrypting and decrypting individual files 708, and so forth.

In general, the threat monitor 720 provides monitoring of a security state and an exposure state of the endpoint. The security state may, for example, be 'compromised', 'secure', or some other state or combination of states. This may be based on detections of known malware, suspicious activity, policy violations and so forth. The exposure state may be 'exposed' or 'unexposed', reflecting whether or not a particular process 704 or file 708 has been exposed to potentially unsafe content. Thus exposure does not necessarily represent a specific threat, but the potential for exposure to unsafe content. This may be tracked in a variety of ways, such as by using the coloring system described above with reference to FIG. 5.

The key wrapper 730 may contain a key ring 732 with one or more keys 734 for encrypting and decrypting files 708. The key ring 732 may be cryptographically protected within the key wrapper 730 in order to prevent malicious access thereto, and the key wrapper 730 may communicate with the extension 710 to provide keys 734 for accessing the files 708 at appropriate times, depending, for example, on whether processes 704 are secure or exposed. In one aspect, the files 708 are stored in a non-volatile memory such as a disk drive, or in a random access memory that provides a cache for the disk drive, and the key wrapper 730 may be stored in a separate physical memory such as a volatile memory accessible to the operating system and the extension 710 but not to processes 704 executing in the user space of the processing environment 702.

In one aspect, every document or file on the endpoint may have a separate key. This may be, for example, a unique, symmetric key that can be used for encryption and decryption of the corresponding file. The key wrapper 730 may control access to the key material for encrypting and decrypting individual files, and may be used by the extension 710 to control access by individual processes 704 executing on the endpoint. As described herein, the extension 710 may generally control access to files 708 based on an exposure state, a security state, or other context such as the user of a calling process or the like. In the event of a severe compromise, or a detection of a compromise independent of particular processes, a key shredding procedure may be invoked to destroy the entire key wrapper 730 immediately and prevent any further access to the files 708. In such circumstances, the keys can only be recovered by the endpoint when a remediation is confirmed. Alternatively, the files may be accessed directly and decrypted from a secure, remote resource that can access the keys 734.

Figure 8:
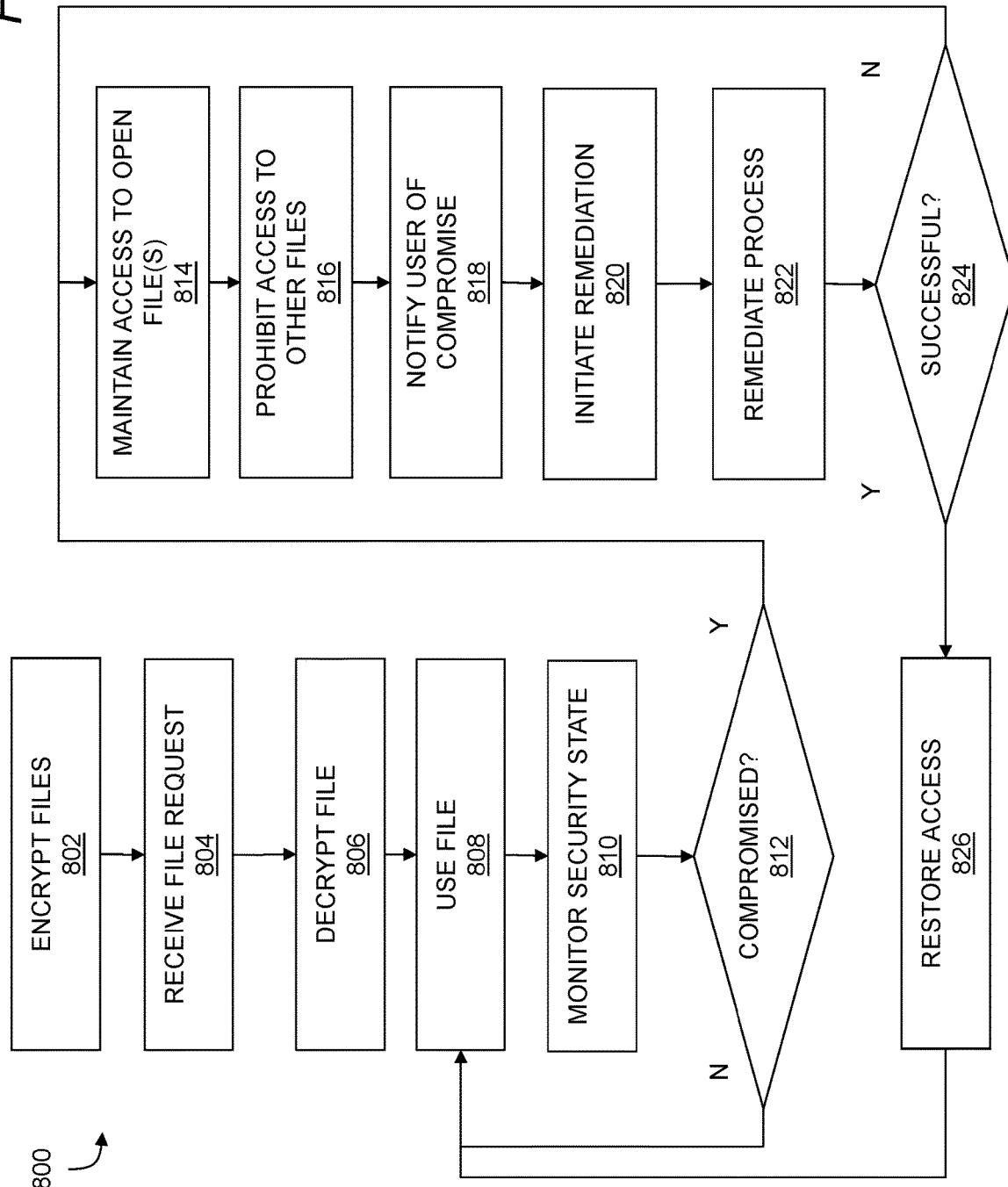
FIG. 8 shows a method for securing an endpoint.

FIG. 8 shows a method for securing an endpoint. In general, all of the files within the file system may be encrypted to place them in a protected state, and then a file system extension such as any of the extensions described above may be used to conditionally grant access by processes to the encrypted files.

As shown in step 802, the method 800 may begin with encrypting a plurality of files on an endpoint to prevent unauthorized access to the plurality of files. This may, for example, include encrypting files using an extension to a file system such as a file system filter, mount point, or other suitable extension to an interface between a user environment for executing processes and a files stored in memory on the endpoint. Encryption may be performed for all content on the endpoint when the endpoint is created or initialized, or when the file system extension is added an operating system for the endpoint, or at some other useful or convenient time. In one aspect, encryption may be performed as a background process over an extended period of time so that the endpoint can remain in use during an initial encryption process. In another aspect, encryption may be performed when files are accessed for the first time, or the initial encryption may be scheduled for a time when the endpoint is not typically in use, e.g., early hours of the morning.

As shown in step 804, the method 800 may include receiving a request to access one of the files from a process executing on the endpoint. In general, this includes receiving an access request at a file system, or at a file system filter or mount point for the file system, or any other extension to file system described herein. With files encrypted as described above, the file system may operate in an ordinary fashion and transparently to the process (or a computing environment for the process) to provide file access functions such as opening, closing, creating, deleting, reading, writing, and so forth, while managing encryption and decryption through the file system extension. The file access function may include an access request as generally contemplated by step 804, which may initially include a request to open or create a file, and may subsequently include read or write operations or other conventional file functions.

As shown in step 806, the method 800 may include decrypting the one of the files for the process. In general, this may be performed transparently by the file system. That is, the process(es) accessing files that are managed by the file system do not need any cryptographic information or other programming overhead. Rather, they simply initiate requests to the file system in a conventional manner, and the file system applies an extension such as any of those described above to manage cryptographic access to files stored by the file system subject to any of the conditions contemplated herein (e.g., an appropriate security state or exposure state). The file system extension may in turn conditionally provide encryption and decryption functions based on a current security state of the process. In general, all of the files managed by the file system may be encrypted, and decrypting a file may include accessing a cryptographic key for the files (or for each of the files) using a file system filter, mount point, or other file system extension and applying the cryptographic key to decrypt the one of the files.

In one aspect, the file system extension (e.g., file system filter or mount point) may be configured to respond to an indication of a severe compromise (e.g., the entire endpoint, multiple processes, or a known, severe threat) by deleting key material stored on the endpoint to prevent all access to files within the file system. Any suitable key recovery techniques may be used to recover the deleted key material once a compromise has been fully resolved. Key recovery may include local key recovery techniques, remote key recovery techniques, or some combination of these. This provides a technique for completely disabling or protecting an endpoint against further data leakage or damage when a severe compromise is detected.

As shown in step 808, the method 800 may include using the file that has been accessed, such as by reading data from the file, writing data to the file, closing the file, saving the file, and so forth.

As shown in step 810, the method 800 may include monitoring a security state of the process that accessed the file. In general, monitoring may be performed by code within the file system extension, or monitoring may be performed by one or more local or remote processes for monitoring reputation, integrity, health, security and the like, any or all of which may communicate with the file system extension to provide updates on a security state of the process or an endpoint executing the process. Monitoring may employ any of the techniques contemplated herein. By way of non-limiting examples, this may include behavior analysis such as detecting a compromised state of the process based on a behavior of the process, a behavior of an associated process, and a behavior of the endpoint. This may also or instead include static analysis such as locally monitoring the process with a file scanner that performs static analysis on related files such as a file (or files) that the process launches from, or a file (or files) that get loaded into the process during execution.

More generally, monitoring the security state of the process may include monitoring observable behaviors for the process. This may include a pattern of file behavior by the process such as reading, writing, creating, deleting, and combinations of the foregoing. This may also or instead include persistence behavior such as writing to a registry or other locations that contain code used at startup to initialize an endpoint by the process (e.g., writing to a registry). In another aspect, this may include inter-process communications such as communications between processes and other process-related actions such as creation of a new process, thread injection, memory injection, and so forth. In another aspect, this may include direct detection of exploits based on specific behaviors, or detection of files loaded into the process that may contain harmful features such as shared dynamic linked libraries, user data files, templates, macros, and so forth.

Monitoring the security state may also or instead include monitoring network behavior such as network traffic associated with the process. For network traffic, coloring techniques such as those described above may be used to label network traffic to facilitate identification and tracking. For example, monitoring the security state of the process may include adding an application identifier to the network traffic originating from the process, wherein the application identifier explicitly identifies an application associated with the process and monitoring network traffic from the process at a gateway between the endpoint and a data network based on the application identifier. The endpoint may also log relevant information to facilitate such monitoring. For example, monitoring may include generating a log of network requests by logging network requests and applications making the network requests. With network behavior locally logged in this manner, monitoring the security state may further include storing an application identifier in the log of network requests, where the application identifier explicitly identifies an application associated with a source process for a network request, and monitoring network requests from the application at a gateway between the endpoint and a data network based on the application identifier.

As shown in step 812, the security state may be evaluated to determine whether the security state has become a compromised state. The security state may be updated periodically or on a fixed or variable schedule, so that the current security state is available for evaluation. The security state may be queried at the time of evaluation. This evaluation may occur periodically on some fixed or variable schedule, or in response to other events, or the evaluation may be performed or initiated by an external software component that pushes notifications to the file system extension when exposures are detected. If the security state is 'not compromised' (e.g., a 'no' to a compromised inquiry) then the endpoint point may continue to operate in the ordinary fashion and the method 800 may return to step 808 where the open file is used. If the security state is a compromised state (a 'yes' to the compromised inquiry), then the method 800 may proceed to step 814 where additional action can be taken. Evaluation of the security state may include the application of one or more rules, e.g., behavior rules. The rules may be applied to the process that accessed the file, to an endpoint, or to another component of the system. Evaluation of the security state may include a behavioral analysis or a static analysis. Evaluation of the security state may also or instead include the use of one or more reputations of processes, e.g., based on the processes themselves, source files, executable code for the processes, activity initiated by the processes, and the like. Evaluation of the security state may include the use of remote resources such as a gateway carrying traffic to and from the endpoint, or a remote threat management facility that provides reputation information, malware signatures, policy information, and the like. Evaluation of the security state may also or instead include a system health status evaluation and the like.

As shown in step 814, while the executing process is in the compromised state, the method 800 may include maintaining access to any open ones of the plurality of files including the file requested in step 804. In general, access may be maintained by continuing to provide encryption/decryption for the open files through a file system extension as described above, or using any other analogous technique. In this manner, the process may continue to execute, preventing a catastrophic or inconvenient termination of an application or the like for the user. The user may continue to use a file, save the file, or otherwise continue with a process in any suitable manner. This may expose some encrypted files within the file system to potentially harmful processes. However, an inference can be made that by the time a compromise is detected, the open files have already been potentially affected. At this point, the remediation strategy can shift to preventing a further spread of harmful impact to other files and data on the endpoint while minimizing impact to the current user.

As shown in step 816 the method 800 may include including prohibiting access to other ones of the plurality of files. In general, access may be prohibited by withholding encryption/decryption functions for the other files through a file system extension as described above, or using any other analogous technique. Prohibiting access may include prohibiting access to all other files managed by the file system, or permitting access to some files while prohibiting access to a subset of files that are identified as protected, confidential, or otherwise labeled for heightened protection. In this manner, when a compromise is detected, the compromised process may continue to execute while being isolated from other files that the process has not yet touched.

As shown in step 818, the method 800 may include providing a notification to a user in a display of the endpoint. The notification may indicate a required remediation step for the process to resolve the compromised state, and the notification may inform the user that an application associated with the process cannot access additional files until the user completes the required remediation step. For example, the notification may include a pop-up window or the like with text stating: "Process X is compromised. You must close all files and restart this process before accessing other content with Process X." The notification may include a number of buttons or the like such as "okay", "remediate now," "remediate later," and so forth.

As shown in step 820, the method 800 may include initiating a remediation of the process. In one aspect, this may include facilitating a restart of the process, such as in response to a user input received from the notification described above.

As shown in step 822, the method 800 may include remediating the compromise. Where the compromise is dynamic in nature, e.g., based on code loaded into an executing process, a restart of the process may be sufficient to fully remediate the compromised state. However, additional remediation steps may be required including registry repair, removal or reinstallation of an application, deletion of files or other clean up and remediation. A variety of tools are known in the art and may be usefully deployed to attempt remediation based upon the nature of the compromised state.

As shown in step 824, the remediation may be evaluated for success. If the remediation is successful, the method 800 may proceed to step 826 where access is restored by the process to the plurality of files managed by the file system. The process may then return to step 808 where files are used in the ordinary manner and encryption and decryption services are transparently provided to the process by the file system extension. If the remediation is unsuccessful, then the process may return to step 814 where the process can continue to access open files but no other files. In this latter case of unsuccessful remediation, additional steps may be taken, such as quarantining an endpoint, permanently disabling the process, or otherwise applying heightened restrictions to the endpoint or the process.

An endpoint such as any of the endpoints described above may be configured according to the foregoing method 800 to provide endpoint security. Thus in one aspect, a system disclosed herein includes an endpoint with a first memory storing a plurality of files that are managed by a file system and encrypted to prevent unauthorized access, as well as a second memory that stores key material for decrypting the plurality of files. The first memory and the second memory may be separate physical memories such as a non-volatile disk-based memory storing the plurality of files and a volatile random access memory storing the key material. The endpoint may include a processor and a process executing on the processor. A file system executing on the processor may be configured to manage access to the plurality of files by the process, and may be further configured to respond to a request from the process for one of the files by conditionally decrypting the one of the files based on a security state of the process. As described above, the file system may conditionally decrypt files using an extension to an operating system of the endpoint such as a file system filter, mount point, or other extension.

The system may include a gateway such as any of the gateways described above. The gateway may be coupled in a communicating relationship with the endpoint and configured to monitor the security state of the process based on network traffic or other behavioral observations for the process. The system may also or instead include a threat management facility such as any of the threat management facilities described above coupled in a communicating relationship with the endpoint and configured to remotely monitor the security state of the process based on indications of compromise received from the endpoint.

Figure 9:
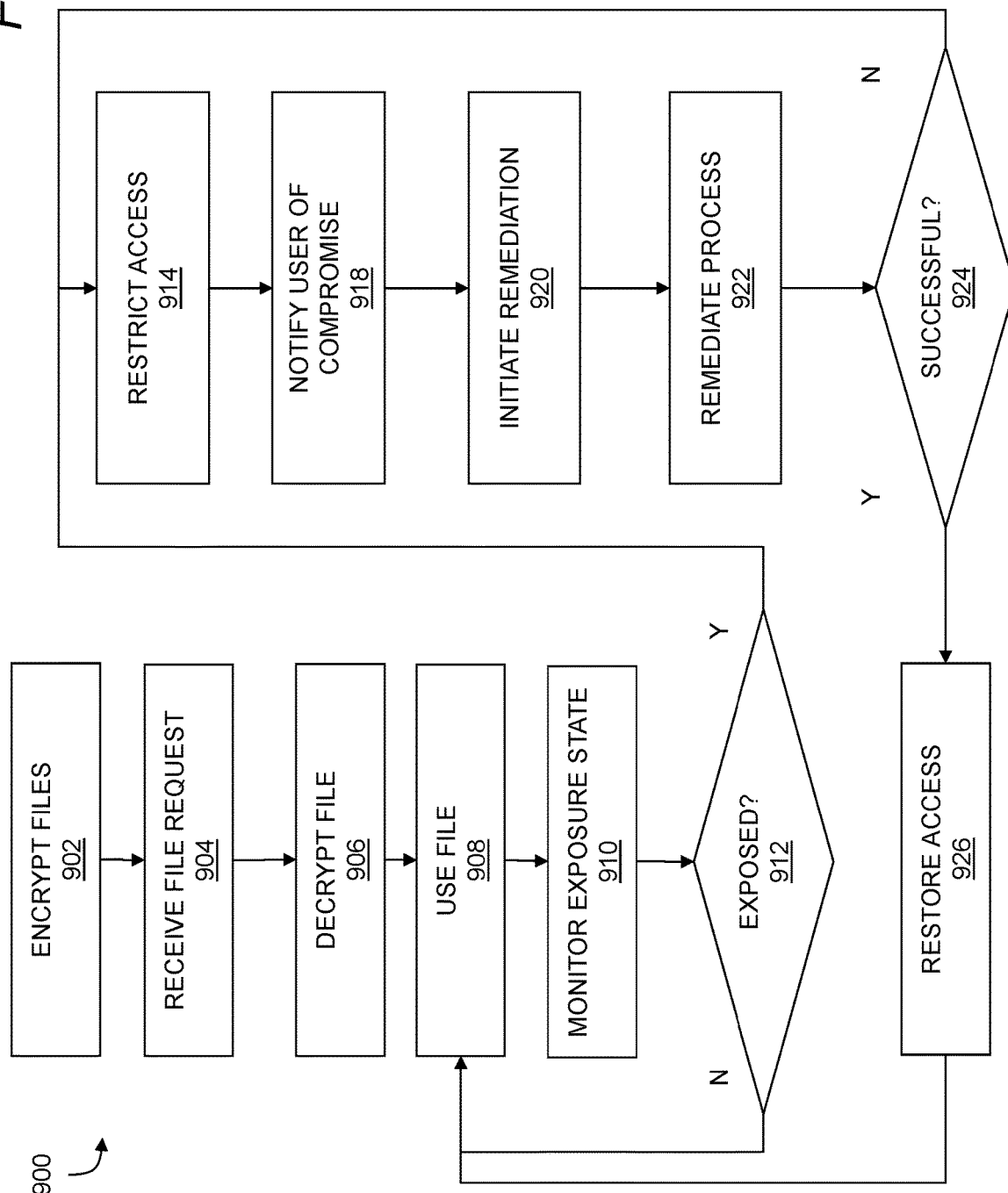
FIG. 9 shows a method for securing an endpoint.

FIG. 9 shows a method for securing an endpoint. In general, the method 900 may operate in a similar manner to the method described above, with a notable exception that the overall method 900 monitors exposure of a process to potentially unsafe content rather than detecting compromised states. It will be appreciated that the method 900 of FIG. 9 may be used instead of or in addition to the method 800 of FIG. 8. That is the two methods may be applied sequentially or in parallel, or some combination of these, by incorporating suitable code/logic into a file system extension that controls access to a cryptographically secured file system.

As shown in step 902, the method 900 may begin with encrypting a plurality of files on an endpoint to prevent unauthorized access to the plurality of files. This may, for example, include encrypting files using an extension to a file system such as a file system filter, mount point, or other suitable extension to an interface between a user environment for executing processes and files stored in memory on the endpoint. Encryption may be performed for all content on the endpoint when the endpoint is created or initialized, or when the file system extension is added an operating system for the endpoint, or at some other useful or convenient time. In one aspect, encryption may be performed as a background process over an extended period of time so that the endpoint can remain in use during an initial encryption process. In another aspect, encryption may be performed when files are accessed for the first time, or the initial encryption may be scheduled for a time when the endpoint is not typically in use, e.g., early hours of the morning.

As shown in step 904, the method 900 may include receiving a request to access one of the files from a process executing on the endpoint. In general, this includes receiving an access request at a file system, or at a file system filter or mount point for the file system, or any other extension to file system described herein. With files encrypted as described above, the file system may operate in an ordinary fashion and transparently to the process (or a computing environment for the process) to provide file access functions such as opening, closing, creating, deleting, reading, writing, and so forth, while managing encryption and decryption through the file system extension. The file access function may include an access request as generally contemplated by step 804, which may initially include a request to open or create a file, and may subsequently include read or write operations or other conventional file functions.

As shown in step 906, the method 900 may include decrypting the one of the files for the process. In general, this may be performed transparently by the file system. That is, the process(es) accessing files that are managed by the file system do not need any cryptographic information or other programming overhead. Rather, they simply initiate requests to the file system in a conventional manner, and the file system applies an extension such as any of those described above to manage cryptographic access to files stored by the file system subject to any of the conditions contemplated herein (e.g., an appropriate security state or exposure state). The file system extension may in turn conditionally provide encryption and decryption functions based on a current security state of the process. In general, all of the files managed by the file system may be encrypted, and decrypting a file may include accessing a cryptographic key for the files using a file system filter, mount point, or other file system extension and applying the cryptographic key to decrypt the one of the files.

In one aspect, the file system extension (e.g., file system filter or mount point) may be configured to respond to an indication of a compromise, or an indication of a severe compromise (e.g., the entire endpoint, multiple processes, or a known, severe threat) by deleting a cryptographic key or other key material stored on the endpoint to prevent all access to files within the file system. Any suitable key recovery techniques may be used to recover the deleted key material once a compromise has been fully resolved. Key recovery may include local key recovery techniques, remote key recovery techniques, or some combination of these. This provides a technique for completely disabling or protecting an endpoint against further data leakage or damage when a severe compromise is detected.

As shown in step 908, the method 900 may include using the file that has been accessed, such as by reading data from the file, writing data to the file, closing the file, saving the file, and so forth.

As shown in step 910, the method 900 may include monitoring an exposure state of the process on the endpoint to potentially unsafe content. In general, exposure will have a state of 'exposed' or 'secure' is based on actual or potential exposure of an executing process to potentially unsafe content such as risky network locations, files outside the encrypted file system, and so forth. A variety of rules may be used to detect exposure.

In general, monitoring the exposure state of the process to potentially unsafe content may include applying a plurality of behavioral rules to determine whether the exposure state of the process is either exposed or secure. Under a basic rule set, the process may be initially identified as secure, and then identified as exposed based on contact with content other than the plurality of files securely managed by the file system. In another aspect, a process may be initially categorized as exposed until a source, user, or other aspects of the process are authenticated. For example, in some implementations, a process may be initially identified as secure, and a process may be identified as exposed when the process makes a network request to a URL that has or is assigned a poor reputation or fits a suspicious pattern. In some implementations, a process may be initially identified as secure, and a process may be identified as exposed when the process requests or opens a file that is identified as exposed. In some implementations, a process may be initially identified as secure, and a process may be identified as exposed when another process opens a handle to the process.

In one aspect, exposure may be measured using a simplified rule set wherein (1) the process is initially identified as secure, (2) the process is identified as exposed when the process opens a network connection to a Uniform Resource Locator that is not internal to an enterprise network of the endpoint and that has a reputation that is poor, (3) the process is identified as exposed when the process opens a first file that is identified as exposed, and (4) the process is identified as exposed when another exposed process opens a handle to the process. The reputation of the Uniform Resource Locator may be obtained from a remote threat management facility such as any of the remote threat management facilities described herein, or the reputation may be looked up in a local database or the like. Where exposure of the first file is used as a basis for determining when the process is exposed, exposure of the first file may be determined in a variety of ways. For example, the first file may be labeled or colored as exposed using the techniques described above, based on some prior context or activity for the file. Or the file may be identified as exposed based on a scan of the file for the presence of malware or the like.

Other conditions or rules may also or instead be used to measure when a process is exposed to potentially unsafe content. For example, the method 900 may include identifying the first file as exposed when at least one of the following conditions is met: (1) the first file is not one of the plurality of files; (2) the first file is saved by a second process that is identified as exposed; and (3) a source of the first file has a low reputation.

As shown in step 912, the process may be evaluated for exposure to potentially unsafe content. This evaluation may occur periodically on some fixed or variable schedule, or in response to other events, or the evaluation may be performed by an external software component that pushes notifications to the file system extension when exposures are detected. When the process is not exposed (i.e., the exposure state is 'secure'), the process may return to step 908 and continue to use files within the file system. When the process is exposed, then the method 900 proceeds to step 914.

As shown in step 914, when the process is exposed the method 900 may include restricting access by the process to the files managed by the file system, more specifically by controlling access to the files through a file system filter or other extension to the file system that conditionally decrypts one or more of the plurality of files for the process according to the exposure state of the process. In this context, restricting access by the process to the files may include maintaining access to any of the plurality of files that have been opened by the process before the process became exposed, and preventing access to other ones of the plurality of files, all as generally described above by way of example in the method 800 of FIG. 8.

As shown in step 918, the method 800 may include providing a notification to a user in a display of the endpoint. The notification may indicate a required remediation step for the process to resolve the exposed state, and the notification may inform the user that an application associated with the process cannot access additional files until the user completes the required remediation step. For example, the notification may include a pop-up window or the like with text stating: "Process X is exposed to potentially unsafe content. You must close all files and restart this process before accessing other content with Process X." The notification may include a number of buttons or the like such as "okay", "remediate now," "remediate later," and so forth.

As shown in step 920, the method 800 may include initiating a remediation of the process. In one aspect, this may include facilitating a restart of the process, such as in response to a user input received from the notification described above, or automatically in the absence of user input.

As shown in step 922, the method 800 may include remediating the exposure. In one aspect, this may include restarting the process. Other steps may include closing or deleting the files that caused the exposure, scanning the endpoint for related content or potential threats, and so forth. The process may also be scanned after a restart to determine whether the exposure has resulted in any instantiation of malware or the like. A variety of other tools are known in the art and may be usefully deployed to attempt remediation based upon the nature of the exposed state.

As shown in step 924, the remediation may be evaluated for success. If the remediation is successful, the method 800 may proceed to step 926 where access is restored for the process to the plurality of files managed by the file system. The process may then return to step 908 where files are used in the ordinary manner and encryption and decryption services are transparently provided to the process by the file system extension. If the remediation is unsuccessful, then the process may return to step 914 where the process can continue to access open files but no other files. In this latter case of unsuccessful remediation, additional steps may be taken, such as quarantining an endpoint, permanently disabling the process, or otherwise applying heightened restrictions to the endpoint or the process.

It will be appreciated that the method for evaluating exposure as described with respect to FIG. 9 may be used exclusively, or may be used concurrently or sequentially with the method for evaluating compromise described with reference to FIG. 8. That is, a method may usefully monitor a security state and an exposure state at the same time, and use either or both of these states to improve endpoint security as contemplated herein. In another aspect, both compromise and exposure may be collectively tracked as two different values to a single security state, with rules applied by the file system extension for file access and remediation according to value. Thus, while monitoring exposure, the method 900 may also include monitoring a security state of the process and restricting access by the process to the plurality of files when the security state is compromised. As described above, monitoring the security state may include monitoring the security state at a threat management facility or locally monitoring the security state with a malware file scanner.

In another aspect an endpoint such as any of the endpoints described above may implement the techniques for exposure monitoring and response as described above. A corresponding system may include an endpoint with a processor and a first memory storing a plurality of files that are encrypted to prevent unauthorized access. A process may be executing on the endpoint, and a file system on the endpoint may be configured to manage access to the plurality of files by the process. The file system may include an extension such as a file system filter or a mount point configured to monitor an exposure state of the process and to restrict access to the one of the files based on the exposure state of the process by conditionally decrypting the one of the files based on the exposure state. The file system may maintain access to any of the files that have been opened by the process before the process became exposed, while preventing access to other ones of the files. The endpoint may include an integrity monitor such as the threat monitor described above configured to evaluate the exposure state by applying a plurality of behavioral rules to determine whether the exposure state of the process is either exposed or secure, wherein the process is initially identified as secure and the process is identified as exposed based on contact with content other than the plurality of files. The endpoint may include a remediation component configured to remediate the process using any of the techniques described herein and return the process from the exposed state to the secure state for unrestricted access to the plurality of files. The remediation component may include any software component, either local to the endpoint or remote from the endpoint, or some combination of these containing code adapted to delete, uninstall, quarantine, isolate, reconfigure, reprogram, monitor or otherwise remediate malicious or potentially malicious code on the endpoint.

The integrity monitor may be further configured to identify the process as exposed according to the plurality of behavioral rules, wherein (1) the process is identified as exposed when the process opens a network connection to a Uniform Resource Locator that is not internal to an enterprise network of the endpoint and that has a reputation that is poor, (2) the process is identified as exposed when the process opens a first file that is identified as exposed, and (3) the process is identified as exposed when another exposed process opens a handle to the process.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for securing an endpoint against exposure to unsafe or unknown content, the computer program product comprising computer-executable code embodied in a non-transitory computer readable medium that, when executing on the endpoint performs the steps of:
    monitoring an exposure state of the endpoint to potentially unsafe content by applying a plurality of behavioral rules to determine whether the exposure state of the endpoint is either exposed or secure, the endpoint initially identified as secure, and the endpoint identified as exposed when a combination of two or more events associated with a process on the endpoint is determined to indicate an exposed state by one of the plurality of behavioral rules; and
    when the exposure state of the endpoint is exposed, controlling access by the endpoint to a plurality of encrypted files stored on a storage resource remote from the endpoint through an extension to a file system filter that conditionally decrypts one or more of the plurality of encrypted files for the endpoint according to the exposure state of the endpoint.

2. The computer program product of claim 1, wherein at least one of the two or more events includes opening a first file identified as exposed, and the first file is not one of the plurality of encrypted files.

3. The computer program product of claim 1, wherein the file system filter conditionally decrypts one or more of the plurality of encrypted files using a cryptographic key.

4. The computer program product of claim 3, wherein the file system filter is configured to respond to an indication of compromise for the endpoint by deleting the cryptographic key on the endpoint.

5. A method comprising:
    monitoring an exposure state of an endpoint to potentially unsafe content by applying a plurality of behavioral rules to determine whether the exposure state of the endpoint is either exposed or secure, the endpoint initially identified as secure and the endpoint identified as exposed when a combination of two or more events associated with a process on the endpoint is determined to indicate an exposed state by one of the plurality of behavioral rules; and
    when the exposure state of the endpoint is exposed, controlling access by the endpoint to a plurality of encrypted files through an extension to a file system filter that conditionally decrypts one or more of the plurality of encrypted files for the endpoint according to the exposure state of the endpoint.

6. The method of claim 5, wherein the plurality of encrypted files is stored on a storage resource remote to the endpoint.

7. The method of claim 5, further comprising identifying the endpoint as exposed based upon a scan of the endpoint, wherein the endpoint is a file that is not one of the plurality of encrypted files.

8. The method of claim 5, wherein the endpoint is identified as exposed when the endpoint opens a network connection to a Uniform Resource Locator having a reputation that is poor.

9. The method of claim 8, further comprising obtaining the reputation for the Uniform Resource Locator from a remote threat management facility.

10. The method of claim 5, wherein the extension conditionally decrypts one or more of the plurality of encrypted files using a cryptographic key.

11. The method of claim 10, wherein the extension is configured to respond to an indication of compromise for the endpoint by deleting the cryptographic key on the endpoint.

12. The method of claim 5, wherein controlling access of the endpoint to the plurality of encrypted files includes maintaining access to any of the plurality encrypted files that have been opened by the endpoint before the endpoint became exposed, and preventing access to other ones of the plurality of encrypted files.

13. The method of claim 5, further comprising monitoring a security state of the endpoint and restricting access by the endpoint to the plurality of encrypted files when the security state is compromised.

14. The method of claim 13, wherein monitoring the security state includes remotely monitoring the security state at a threat management facility or locally monitoring the security state with a malware file scanner.

15. The method of claim 5, further comprising initiating a remediation of the endpoint when the endpoint is exposed.

16. The method of claim 15, wherein, if the remediation is successful, restoring access to all of the plurality of encrypted files by the endpoint.

17. The method of claim 5, further comprising providing a notification to a user in a display of the endpoint, the notification indicating a required remediation step for the endpoint to resolve the exposure state, and the notification informing the user that an application associated with the endpoint cannot access additional files until the user completes the required remediation step.

18. A system comprising:
    an endpoint;
    a storage resource remote from the endpoint and in communication with the endpoint, the storage resource storing a plurality of encrypted files;
    a file system on the endpoint, the file system configured to manage access to the plurality of encrypted files by the endpoint, the file system including an extension configured to monitor an exposure state of the endpoint and to restrict access to the plurality of encrypted files based on the exposure state of the endpoint by conditionally decrypting one of the files of the plurality of encrypted files based on the exposure state;
    an integrity monitor configured to evaluate the exposure state of the endpoint by applying a plurality of behavioral rules to determine whether the exposure state of the endpoint is either exposed or secure, the endpoint initially identified as secure and the endpoint identified as exposed when a combination of two or more events associated with a process on the endpoint is determined to indicate an exposed state by one of the plurality of behavioral rules; and a remediation component configured to remediate the endpoint from the exposure state of exposed to the exposure state of secure for unrestricted access to the plurality of encrypted files.

19. The system of claim 18, wherein the integrity monitor is on the endpoint.

* * * * *